US 12,485,661 B2

(12) United States Patent
Song et al.

(10) Patent No.: US 12,485,661 B2
(45) Date of Patent: Dec. 2, 2025

(54) FILM LAMINATING APPARATUS AND ELECTRODE SHEET PROCESSING DEVICE

(71) Applicant: CONTEMPORARY AMPEREX TECHNOLOGY (HONG KONG) LIMITED, Hong Kong (CN)

(72) Inventors: Lei Song, Fujian (CN); Hong Lin, Fujian (CN); Mou Zeng, Fujian (CN); Guangcheng Zhong, Fujian (CN); Ningbo Du, Fujian (CN); Jinlong Huang, Fujian (CN); Pengpeng Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 151 days.

(21) Appl. No.: 18/504,321

(22) Filed: Nov. 8, 2023

(65) Prior Publication Data
US 2024/0157691 A1 May 16, 2024

Related U.S. Application Data

(63) Continuation of application No. PCT/CN2023/082815, filed on Mar. 21, 2023.

(30) Foreign Application Priority Data

Nov. 10, 2022 (CN) .......................... 202222994835.6

(51) Int. Cl.
*B32B 37/00* (2006.01)
*B32B 38/00* (2006.01)
*B32B 41/00* (2006.01)

(52) U.S. Cl.
CPC ...... *B32B 37/0053* (2013.01); *B32B 38/0004* (2013.01); *B32B 2041/04* (2013.01); *B32B 2457/10* (2013.01)

(58) Field of Classification Search
CPC ............ B32B 37/0053; B32B 38/0004; B32B 2041/04; B32B 2457/10; B32B 38/1816;
(Continued)

(56) References Cited

U.S. PATENT DOCUMENTS 9,575,343 B2 * 2/2017 Hada ....................... B32B 37/02
2023/0219335 A1 * 7/2023 Takayama ........... B32B 37/0015
156/270

FOREIGN PATENT DOCUMENTS

CN         209617596 U    11/2019
CN         112644771 A     4/2021
(Continued)

OTHER PUBLICATIONS

JP 2002052615—Machine Translation (Year: 2002).*
International Search Report dated Jun. 12, 2023 for Application No. PCT/CN2023/082815.

*Primary Examiner* — George R Koch
*Assistant Examiner* — Christopher C Caillouet
(74) *Attorney, Agent, or Firm* — Ladas & Parry LLP

(57) ABSTRACT

A film laminating apparatus and an electrode sheet processing device are disclosed. The film laminating apparatus includes a frame, a conveying mechanism, a mounting plate, and a plurality of film laminating mechanisms, the plurality of film laminating mechanisms being mounted on the mounting plate; the conveying mechanism being mounted on the frame and being capable of conveying an electrode sheet in a first direction into the film laminating apparatus; and the mounting plate being mounted on the frame and forming an included angle with the first direction. The plurality of film laminating mechanisms are tilted or vertically arranged relative to the conveying direction of an electrode sheet. The space occupied by the plurality of film laminating mechanisms, the size of the film laminating apparatus, the volume of the film laminating apparatus, and
(Continued)

the space occupied by the film laminating apparatus in the conveying direction of the electrode sheet is reduced.

18 Claims, 9 Drawing Sheets

(58) Field of Classification Search
CPC .............. B32B 39/00; B65H 2301/516; B65H 23/1825; B65H 2801/72; B65H 20/34; B65H 26/02; Y02P 70/50; B65B 33/02; B65B 41/16; B65B 61/00; H01M 10/0404; H01M 10/0585
See application file for complete search history.

(56) References Cited

FOREIGN PATENT DOCUMENTS

| | | | | |
|---|---|---|---|---|
| CN | 113060340 A | 7/2021 | | |
| CN | 215248638 U | 12/2021 | | |
| CN | 215591112 U | 1/2022 | | |
| CN | 216734936 U | 6/2022 | | |
| CN | 114709466 A | 7/2022 | | |
| CN | 218401166 U | 1/2023 | | |
| JP | H1177899 A | 3/1999 | | |
| JP | 2002052615 | * | 2/2002 | ............. B32B 39/00 |
| WO | 2018076423 A1 | 5/2018 | | |

\* cited by examiner

FILM LAMINATING APPARATUS AND ELECTRODE SHEET PROCESSING DEVICE

CROSS-REFERENCE TO RELATED APPLICATIONS

This application is a continuation of International application PCT/CN2023/082815 filed on Mar. 21, 2023 that claims priority to Chinese Patent Application No. 202222994835.6 filed on Nov. 10, 2022, which is incorporated herein by reference in its entirety.

TECHNICAL FIELD

The present application belongs to the technical field of electrode sheet film lamination, and in particular relates to a film laminating apparatus and an electrode sheet processing device.

BACKGROUND

With the development of new energy technology, batteries, as one of core components of new energy vehicles, have also been widely used.

In the production process of batteries, after an electrode sheet is die-cut, to protect the electrode sheet, the electrode sheet is usually laminated with a protective film using a film laminating apparatus. However, in some cases, the film laminating apparatus has the defects of large volume and large space occupation.

SUMMARY OF THE INVENTION

The objective of embodiments of the present application is to provide a film laminating apparatus and an electrode sheet processing device for solving the problems of, including but not limited to, large volume and large space occupation of the film laminating apparatus.

The embodiments of the present application adopt the following technical solution:

In a first aspect, an embodiment of the present application provides a film laminating apparatus, including a frame, a conveying mechanism, a mounting plate, and a plurality of film laminating mechanisms, the plurality of film laminating mechanisms being mounted on the mounting plate; the conveying mechanism being mounted on the frame and being capable of conveying an electrode sheet in a first direction into the film laminating apparatus; and the mounting plate being mounted on the frame and forming an included angle with the first direction.

When the film laminating apparatus of this embodiment of the present application is assembled, the plurality of film laminating mechanisms are mounted on the mounting plate, and then the mounting plate is mounted on the frame in a manner of forming a certain included angle with the first direction. Alternatively, first the mounting plate is mounted on the frame in a manner of forming a certain included angle with the first direction, and then the plurality of film laminating mechanisms are mounted on the mounting plate. The mounting plate of the film laminating apparatus mounted in such a manner is not parallel to the first direction, so that the plurality of film laminating mechanisms are tilted or vertically arranged relative to the conveying direction of an electrode sheet. Therefore, the space occupied by the plurality of film laminating mechanisms in the conveying direction of the electrode sheet is reduced, the size of the film laminating apparatus in the conveying direction of the electrode sheet is reduced, the volume of the film laminating apparatus in the conveying direction of the electrode sheet is reduced, and the space occupied by the film laminating apparatus in the conveying direction of the electrode sheet is reduced.

In an embodiment, the included angle between the mounting plate and the first direction is 85° to 95°.

In the film laminating apparatus of this embodiment of the present application, the included angle between the mounting plate and the first direction is set within the above range, and the mounting plate is nearly perpendicular to the first direction. Therefore, the space occupied by the plurality of film laminating mechanisms in the first direction is smaller, the size of the film laminating apparatus in the conveying direction of the electrode sheet can be effectively reduced, the volume of the film laminating apparatus in the conveying direction of the electrode sheet is reduced, and the space occupied by the film laminating apparatus in the conveying direction of the electrode sheet is reduced.

In an embodiment, the mounting plate is arranged perpendicular to the first direction.

In the film laminating apparatus of this embodiment of the present application, the mounting plate is arranged perpendicular to the first direction. Therefore, the space occupied by the plurality of film laminating mechanisms in the first direction is maximally reduced, the size of the film laminating apparatus in the conveying direction of the electrode sheet is maximally reduced, the volume of the film laminating apparatus in the conveying direction of the electrode sheet is maximally reduced, and the space occupied by the film laminating apparatus in the conveying direction of the electrode sheet is maximally reduced.

In an embodiment, the number of the film laminating mechanisms is two, and the two film laminating mechanisms are distributed in the height direction of the mounting plate and used for laminating films on the opposite two surfaces of the electrode sheet respectively.

When the film laminating apparatus of this embodiment of the present application performs film lamination, the electrode sheet passes through the two film laminating mechanisms arranged vertically, and the two film laminating mechanisms simultaneously laminate films to the upper and lower surfaces of the electrode sheet, thereby improving the film laminating efficiency. In addition, the two film laminating mechanisms are positioned above and below the electrode sheet respectively, and cannot occupy much space in the conveying direction of the electrode sheet, so that the film laminating apparatus has a relatively compact structure and small volume.

In an embodiment, the film laminating mechanism includes a first film suction member, a film pulling module, a film cutting module, and a film laminating module which are mounted on the mounting plate, the first film suction member being used for sucking a protective film; the film laminating module including a second film suction member, and the first film suction member and the second film suction member being arranged apart; the film pulling module being used for pulling the protective film from the first film suction member onto the second film suction member; and the film cutting module being used for cutting the protective film between the first film suction member and the second film suction member.

In the film laminating apparatus of this embodiment of the present application, the protective film is sucked on the first film suction member, the film pulling module pulls the protective film from the first film suction member onto the second film suction member of the film laminating apparatus, the film cutting module disconnects the protective film between the first film suction member and the second film suction member, and the second film suction member sucks and fixes the protective film and then adheres the protective film onto the electrode sheet. In this manner, lamination of the protective film of the electrode sheet is completed.

In an embodiment, the film pulling module includes a first film pulling driving member, a second film pulling driving member, and a film adhering assembly, the film adhering assembly being used for adhering a protective film; the first film pulling driving member being connected to the film adhering assembly and used for driving the film adhering assembly to abut against the protective film on the first film suction member, so that the protective film is adhered to the film adhering assembly; and the second film pulling driving member being mounted on the mounting plate, connected to the first film pulling driving member, and used for driving the film adhering assembly to move in a direction from the first film suction member to the second film suction member, thereby transferring the protective film adhered to the film adhering assembly to the second film suction member.

In the film laminating apparatus of this embodiment of the present application, the second film pulling driving member moves the first film pulling driving member and the film adhering assembly to the first film suction member, and the first film pulling driving member drives the film adhering assembly to move towards the protective film on the first film suction member. When the film adhering assembly abuts against the protective film on the first film suction member, the protective film is adhered to the film adhering assembly, the first film pulling driving member drives the film adhering assembly to move away from the first film suction member, and the film adhering assembly drives the protective film to detach from the first film suction member. The second film pulling driving member then drives the first film pulling driving member and the film adhering assembly to move together towards the second film suction member. When the film adhering assembly moves to the second film suction member, the first film pulling driving member drives the film adhering assembly to move towards the second film suction member. After the second film suction member sucks the protective film on the film adhering assembly, the first film pulling driving member drives the film adhering assembly to move away from the second film suction member, so that the film adhering assembly is detached from the protective film. In this manner, the protective film is transferred from the first film suction member to the second film suction member.

In an embodiment, the film adhering assembly includes a film adhering roller, a film adhering mounting rack, and an abutting telescopic member mounted on the film adhering mounting rack, the film adhering roller being rotatably mounted on the film adhering mounting rack and used for adhering the protective film; a telescopic end of the abutting telescopic member being used for abutting against the film adhering roller to prevent the film adhering roller from rotating; and the first film pulling driving member being connected to the film adhering mounting rack.

In the film laminating apparatus of this embodiment of the present application, driven by the first film pulling driving member and the second film pulling driving member, the protective film on the first film suction member is transferred to the second film suction member. The telescopic end of the abutting telescopic member extends and abuts against the film adhering roller to limit the rotation of the film adhering roller, thereby preventing the protective film from falling off from the film adhering roller due to the rotation of the film adhering roller in the subsequent process of driving the film adhering roller to move by the first film pulling driving member and the second film pulling driving member to pull the protective film to move, and ensuring that the protective film can be stably and reliably pulled from the first film suction member to the second film suction member.

In an embodiment, the film laminating mechanism further includes an unwinding reel, a damper, and a temporary-storage film feeding mechanism which are mounted on the mounting plate, the damper being used for winding the protective film unwound by the unwinding reel, and the temporary-storage film feeding mechanism being used for temporarily storing the protective film drawn out from the damper, tensioning the temporarily stored protective film, and then introducing the protective film to the first film suction member.

In the film laminating apparatus of this embodiment of the present application, under the tensioning effect of the temporary-storage film feeding mechanism, the protective film at the first film suction member is in a tensioned state, and the protective film is evenly sucked on the first film suction member, so that the defects such as bubbles and wrinkles in the protective film sucked by the first film suction member are reduced, and the laminated film quality is improved. Moreover, the protective film at the first film suction member is in a tensioned state, so the protective film cannot become superfluous or loose, ensuring that the length of every section of the protective film is consistent after the film cutting module cuts the protective film into sections, reducing the risk of undesirable film size and also improving the laminated film quality.

In an embodiment, the temporary-storage film feeding mechanism includes a lift cylinder, a first temporary-storage roller, a second temporary-storage roller, and a conveying roller which are mounted on the mounting plate, both the first temporary-storage roller and the conveying roller being arranged above the second temporary-storage roller; the first temporary-storage roller, the second temporary-storage roller, and the conveying roller being used for winding the protective film outputted by the damper in sequence; the conveying roller being used for guiding the protective film to the first film suction member; and a piston rod of the lift cylinder being connected to the second temporary-storage roller and used for driving the second temporary-storage roller to move downwards.

In the film laminating apparatus of this embodiment of the present application, the second temporary-storage roller pulls the protective film between the first temporary-storage roller and the conveying roller to move downwards under the gravity action of the second temporary-storage roller, thereby tensioning the protective film between the first temporary-storage roller and the first film suction member. When the pulling force of the film pulling module on the protective film is greater than the gravity of the second temporary-storage roller, the film pulling module pulls the protective film to move towards the second film suction member. At this point, one end of the protective film at the first film suction member is pulled by the film pulling module, and the other end is subjected to the gravity action of the second temporary-storage roller, such that the protective film at the first film suction member is tensioned.

In an embodiment, the film laminating module further includes an adjustment driving assembly and a plurality of connecting assemblies, the adjustment driving assembly being connected to the mounting plate; each connecting assembly being connected to the second film suction member; all the connecting assemblies being distributed at intervals; each connecting assembly being connected to the adjustment driving assembly; and the adjustment driving assembly being used for driving two adjacent connecting assemblies to be close to or far away from each other.

In the film laminating apparatus of this embodiment of the present application, the distance between two adjacent connecting assemblies may be adjusted by the adjustment driving assembly to adjust the distance between two adjacent second film suction members, thereby meeting the requirements of film lamination at different positions on different electrode sheets. In addition, the film laminating mechanism uses a single film laminating module to achieve film lamination at a plurality of positions on an electrode sheet without the need for a plurality of film laminating modules, such that the volume of the whole film laminating apparatus is greatly reduced and the space occupation is reduced.

In an embodiment, the connecting assembly includes a first connecting rack, a second connecting rack, a film laminating driving member, and a temporary-storage driving member, the first connecting rack being connected to the adjustment driving assembly; the film laminating driving member being mounted on the first connecting rack; the second film suction member being mounted on the second connecting rack; the film laminating driving member being connected to the second connecting rack and used for driving the second film suction member to move towards the electrode sheet in a second direction to adhere the protective film sucked by the second film suction member to the electrode sheet; and the temporary-storage driving member being connected to the second connecting rack and the first connecting rack, and used for driving the second film suction member to move in the direction opposite to the second direction.

When the film laminating apparatus of this embodiment of the present application performs film lamination, before the film laminating driving member drives the second film suction member to almost abut the protective film on the electrode sheet, the temporary-storage driving member is started to drive the second connecting rack to move in the direction opposite to the second direction, and thus a counterforce is formed between the film laminating driving member and the temporary-storage driving member, thereby lowering the speed of the film laminating driving member approaching the electrode sheet in the second direction, reducing the impact force between the second film suction member and the electrode sheet, and reducing damage to the electrode sheet.

In an embodiment, the film laminating apparatus further includes a first temporary-storage mechanism mounted on the frame, and the conveying mechanism includes a receiving assembly and a drawing assembly mounted on the frame, the receiving assembly being used for receiving an electrode sheet conveyed by an external device; the first temporary-storage mechanism being positioned between the receiving assembly and the film laminating apparatus; the receiving assembly being positioned between the first temporary-storage mechanism and the drawing assembly; the first temporary-storage mechanism being used for temporarily storing the electrode sheet conveyed by the receiving assembly; and the drawing assembly being used for drawing and stopping continuous conveying of the electrode sheet drawn out from the film laminating mechanism.

In the film laminating apparatus of this embodiment of the present application, the electrode sheet conveyed by the external device passes through the receiving assembly, the first temporary-storage mechanism, and the film laminating mechanism before entering the drawing assembly. When the film laminating apparatus is operated, the drawing assembly draws the electrode sheet to convey the electrode sheet forward, and the electrode sheet conveyed by the external device continuously passes through the receiving assembly and the first temporary-storage mechanism, enters the film laminating mechanism to be laminated, and then is conveyed by the drawing assembly.

In an embodiment, the first temporary-storage mechanism includes a temporary-storage driving member, a third temporary-storage roller for winding the electrode sheet, and a fourth temporary-storage roller for winding the electrode sheet, the temporary-storage driving member being mounted on the frame; both the third temporary-storage roller and the fourth temporary-storage roller being connected to the temporary-storage driving member; and the temporary-storage driving member being used for driving the fourth temporary-storage roller to move close to or away from the third temporary-storage roller.

In the film laminating apparatus of this embodiment of the present application, the electrode sheet conveyed by the receiving assembly is wound on the third temporary-storage roller and the fourth temporary-storage roller. When the film laminating apparatus starts performing film lamination, the temporary-storage driving member drives the third temporary-storage roller and the fourth temporary-storage roller to be away from each other, so that the length of the electrode sheet between the third temporary-storage roller and the fourth temporary-storage roller is increased. In this way, the electrode sheet conveyed by the receiving assembly is temporarily stored and cannot enter the film laminating mechanism, so that static film lamination within the film laminating mechanism is achieved, and the accuracy of film lamination is improved.

In an embodiment, the film laminating apparatus further includes a second temporary-storage mechanism mounted on the frame, and the conveying mechanism further includes a winding assembly mounted on the frame, the second temporary-storage mechanism being used for temporarily storing the electrode sheet outputted by the drawing assembly, and the winding assembly being used for winding the electrode sheet outputted by the second temporary-storage mechanism.

In the film laminating apparatus of this embodiment of the present application, the second temporary-storage mechanism is additionally arranged. After the drawing assembly stops conveying the electrode sheet, the second temporary-storage mechanism conveys the temporarily stored electrode sheet to the winding assembly, thereby preventing the winding assembly from pulling the electrode sheet and reducing the risk of breakage of the electrode sheet.

In an embodiment, the film laminating apparatus further includes a first tension detection member, the first tension detection member being mounted on the frame, used for detecting the tension of the electrode sheet outputted by the second temporary-storage mechanism, and electrically connected to the second temporary-storage mechanism.

In the film laminating apparatus of this embodiment of the present application, when the first tension detection member detects that the tension value of the electrode sheet is greater than a preset value, the second temporary-storage mechanism outputs longer electrode sheet to be wound by the winding assembly, thereby reducing the risk of breakage of the electrode sheet pulled by the winding assembly. When the first tension detection member detects that the tension value of the electrode sheet is less than the preset tension value, the second temporary-storage mechanism temporarily stores the electrode sheet, thereby reducing the risk of the electrode sheet becoming superfluous and loose and falling.

In an embodiment, the film laminating apparatus further includes a visual detection mechanism mounted on the frame and used for detecting defects on the electrode sheet outputted by the second temporary-storage mechanism.

In the film laminating apparatus of this embodiment of the present application, when the electrode sheet outputted by the second temporary-storage mechanism is conveyed to the visual detection mechanism, the visual detection mechanism may detect defects on the electrode sheet, thereby facilitating subsequent processing and improving the quality of the electrode sheet.

In an embodiment, the film laminating apparatus further includes a marking mechanism mounted on the frame and used for marking the defects on the electrode sheet detected by the visual detection mechanism.

In the film laminating apparatus of this embodiment of the present application, the marking mechanism can mark the defects on the electrode sheet to facilitate subsequent processing and improve the quality of the electrode sheet.

an electrode sheet processing device of an embodiment of the present application uses the aforementioned film laminating apparatus. The volume of the film laminating apparatus in the conveying direction of an electrode sheet is small, which can also reduce the volume of the whole electrode sheet processing device and reduce the occupation of space. The electrode sheet processing device can be suitable for a smaller mounting space, and the application scenarios of the electrode sheet processing device are expanded.

In a second aspect, an embodiment of the present application provides an electrode sheet processing device, including the aforementioned film laminating apparatus.

In an embodiment, the electrode sheet processing device further includes a die-cutting apparatus, and the number of the film laminating apparatuses is two, the die-cutting apparatus being used for dividing an electrode sheet into two electrode sheets; and the two film laminating apparatuses being arranged vertically and used for receiving the two electrode sheets and laminating films on the two electrode sheets.

In the electrode sheet processing device of this embodiment of the present application, the die-cutting apparatus die cuts an electrode sheet into two electrode sheets, and the two electrode sheets are respectively introduced into the two film laminating apparatuses arranged vertically. The two film laminating apparatuses respectively laminate films on the two electrode sheets, achieving simultaneous film lamination of the two electrode sheets. Manual transportation of the cut electrode sheets to the film laminating apparatuses is not required, improving the production efficiency and reducing labor costs. In addition, the two film laminating apparatuses are arranged vertically, have a compact structure, and are conducive to reducing the volume of the electrode sheet processing device.

DESCRIPTION OF DRAWINGS

In order to provide a clearer explanation of the technical solutions in the embodiments of the present application, a brief introduction will be given to the accompanying drawings required in the embodiments or exemplary technical descriptions. It is evident that the accompanying drawings in the following description are only some embodiments of the present application. For those skilled in the art, other accompanying drawings can be obtained based on these drawings without any creative effort.

Figure 1:
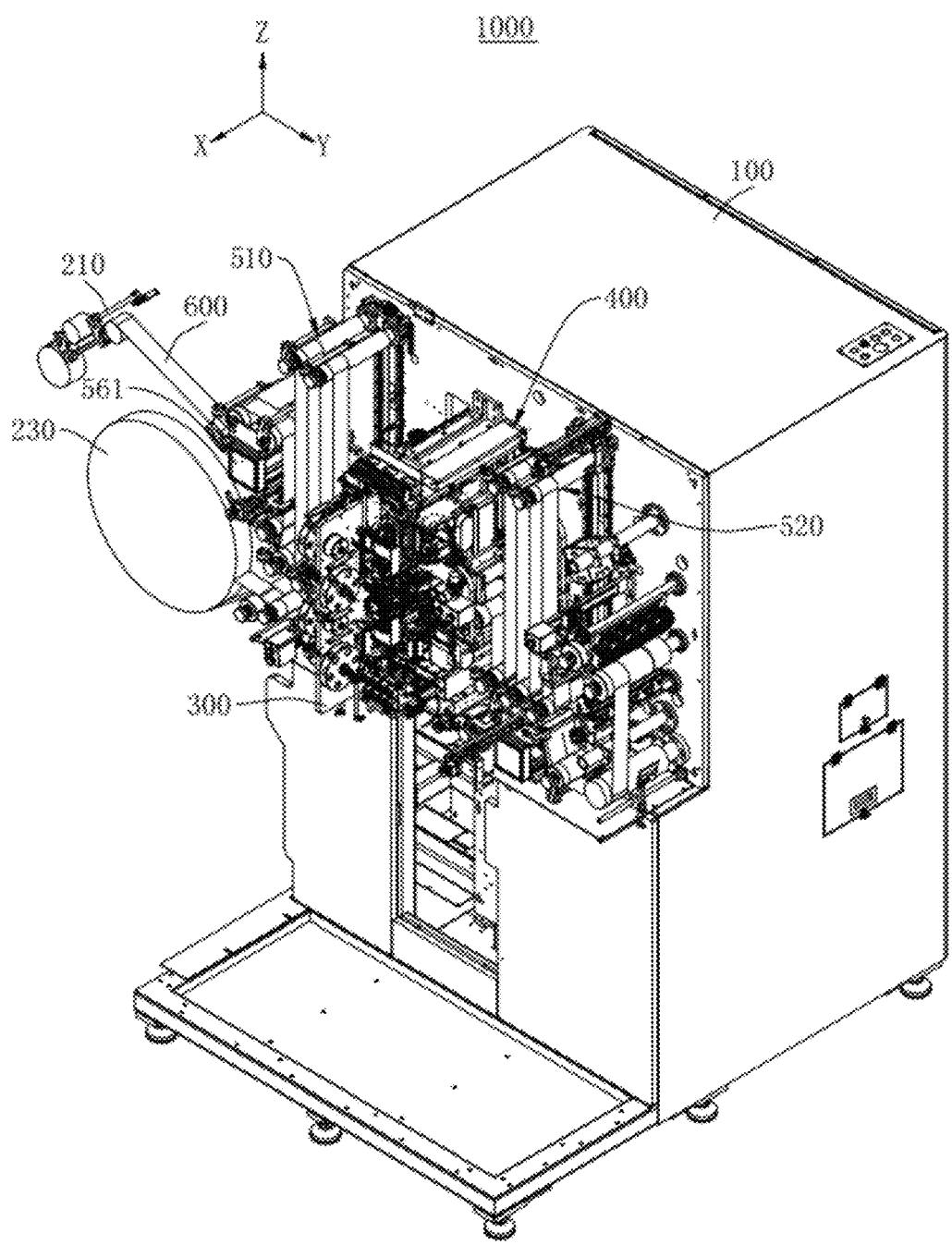
FIG. 1 is a structural schematic diagram of a film laminating apparatus provided in an embodiment of the present application from one perspective.

Here, the reference numerals in the drawings are as follows:

| | | |
|---|---|---|
| 100-Frame | 200-Conveying mechanism | 210-Receiving assembly |
| 220-Drawing assembly | 230-Winding assembly | 300-Mounting plate |
| 301-Perforated hole | 400-Film laminating mechanism | 410-First film suction member |
| 420-Film pulling module | 430-Film cutting module | 440-Film laminating module |
| 450-Unwinding reel | 460-temporary-storage film feeding mechanism | 470-Damper |
| 421-First film pulling driving member | 422-Second film pulling driving member | 423-Film adhering assembly |
| 424-Film pulling connecting rack | 425-Film pulling connecting plate | 431-Film cutting driving member |
| 432-Film cutting knife | 433-Film cutting connecting rack | 434-Film cutting connecting plate |
| 441-Second film suction | 442-Adjustment driving | 443-Connecting assembly |

| | | |
|---|---|---|
| member | assembly | |
| 444-Film laminating moving member | 461-Lift cylinder | 462-First temporary-storage roller |
| 463-Second temporary-storage roller | 464-Conveying roller | 510-First temporary-storage mechanism |
| 511-temporary-storage driving member | 512-Third temporary-storage roller | 513-Fourth temporary-storage roller |
| 514-First roller mounting base | 515-Second roller mounting base | 516-Temporary-storage connecting rack |
| 520-Second temporary-storage mechanism | 530-First tension detection member | 540-Visual detection mechanism |
| 541-First camera | 542-Second camera | 550-Marking mechanism |
| 561-First correcting member | 562-Second correcting member | 570-Encoding roller |
| 600-electrode sheet | 1000-Film laminating apparatus | 4221-Film pulling screw rod |
| 4222-Film pulling sliding sleeve | 4223-Film pulling motor | 4224-Transmission assembly |
| 4231-Film adhering roller | 4232-Film adhering mounting rack | 4233-Abutting telescopic member |
| 4421-Adjustment connecting plate | 4422-Adjustment screw rod | 4431-First connecting rack |
| 4432-Second connecting rack | 4433-Film laminating driving member | 4434-temporary-storage driving member |
| 5111-Temporary-storage motor | 5112-Temporary-storage belt | 5113-Temporary-storage pulley |

DETAILED DESCRIPTION

The following is a detailed description of the embodiments of the present application, and examples of the embodiments are shown in the accompanying drawings, where the same or similar reference numerals throughout represent the same or similar elements or elements with the same or similar functions. The embodiments described below with reference to the accompanying drawings are exemplary and intended to explain the present application, but cannot be understood as limiting the present application.

In the description of the present application, it should be understood that the terms "length", "width", "upper", "lower", "front", "back", "left", "right", "vertical", "horizontal", "top", "bottom", "inner", "outer" and other indications of orientation or positional relationship are based on the orientation or positional relationship shown in the accompanying drawings, only for the convenience of describing the present application and simplifying the description, rather than indicating or implying that the apparatuses or elements referred to must have a specific orientation or be constructed and operated in a specific orientation, and therefore cannot be understood as a limitation on the present application.

In addition, the terms "first" and "second" are only used for description and cannot be understood as indicating or implying relative importance or implying the quantity of technical features indicated. Therefore, features limited by "first" and "second" may explicitly or implicitly include one or more of same features. In the description of the present application, "a plurality of" means two or more, unless otherwise specified.

In the present application, unless otherwise specified and limited, the terms "mount", "connect", "link", "fix" and other terms should be understood in a broad sense, for example, it may be a fixed connection, a detachable connection, or an integrated connection; it may also be a mechanical connection or an electrical connection; it may be a direct connection or an indirect connection through an intermediate medium; and it may be an internal communication between two elements or an interaction relationship between two elements. For those skilled in the art, the specific meaning of the above terms in the present application may be understood according to specific circumstances.

In the description of the present application, it should be noted that the term "and/or" only refers to an association relationship for describing associated objects, indicating that three relationships may exist. For example, A and/or B may represent three situations: A exists alone, both A and B exist, and B exists alone.

It should also be noted that in the embodiments of the present application, the same components or parts are represented by the same reference numerals in the accompanying drawings. For the same parts in the embodiments of the present application, the reference numeral in the accompanying drawings of one of the parts or components may only be used as an example. It should be understood that for other same parts or components, the reference numeral also applies.

In the present application, the terms "one embodiment", "some embodiments", "examples", "specific examples", or "some examples" refer to that specific features, structures, materials, or characteristics described in conjunction with the embodiments or examples are included in at least one embodiment or example of the present application. In this specification, the schematic expressions of the above terms do not necessarily refer to the same embodiments or examples. Moreover, the specific features, structures, materials, or characteristics described may be combined in an appropriate manner in any one or more embodiments or examples. In addition, those skilled in the art may incorporate and combine different embodiments or examples, as well as the features of different embodiments or examples described in this specification without contradiction.

In some cases, protective films need to be laminated in a plurality of positions of an electrode sheet. To improve the film laminating efficiency, a plurality of film laminating mechanisms are usually arranged in a film laminating apparatus. The plurality of film laminating mechanisms are arranged in sequence in the conveying direction of an electrode sheet, and laminate protective films to corresponding positions respectively one by one. However, the plurality of film laminating mechanisms are arranged in sequence in the conveying direction of electrode sheets, resulting in a larger size of the film laminating apparatus in the conveying direction (first direction) of the electrode sheets, and a larger volume and larger space occupation of the film laminating apparatus in the conveying direction of the electrode sheets.

To alleviate the above problems, a plurality of film laminating mechanisms are mounted on a mounting plate, and then the mounting plate is mounted on a frame in a manner of forming an included angle with the conveying direction (i.e., first direction) of an electrode sheet, so that the plurality of film laminating mechanisms are tilted or vertically arranged relative to the conveying direction of the electrode sheet. Therefore, the space occupied by the plurality of film laminating mechanisms in the conveying direction of the electrode sheet is reduced, the size of the film laminating apparatus in the conveying direction of the electrode sheet is reduced, the volume of the film laminating apparatus in the conveying direction of the electrode sheet is reduced, and the space occupied in the conveying direction of the electrode sheet is reduced.

It should be noted that the film laminating apparatus of the embodiments of the present application may be used at any position on an electrode sheet that needs to be laminated. For the sake of clarity, the film laminating apparatus of the embodiments of the present application is illustrated by taking film lamination at a corner of the electrode sheet as an example. The corner of the electrode sheet refers to the position where the electrode sheet at both ends of a sheet-like coil core changes from a straight state to a bent state and changes from a bent state to a straight state after the electrode sheet is wound into a cylindrical shape and then hot pressed to form the sheet-like coil core. In some cases, both the front and back sides of the electrode sheet need to be laminated at these two positions.

In the present application, for the convenience of description, a Z-axis in the accompanying drawings represents the up and down direction, the positive direction of the Z-axis represents the up direction, and the negative direction of the Z-axis represents the down direction; a Y-axis in the accompanying drawings represents the left and right direction, the positive direction of the Y-axis represents the right, and the negative direction of the Y-axis represents the left; an X-axis in the accompanying drawings represents the front and back direction, the positive direction of the X-axis represents the front, and the negative direction of the X-axis represents the back.

Figure 2:
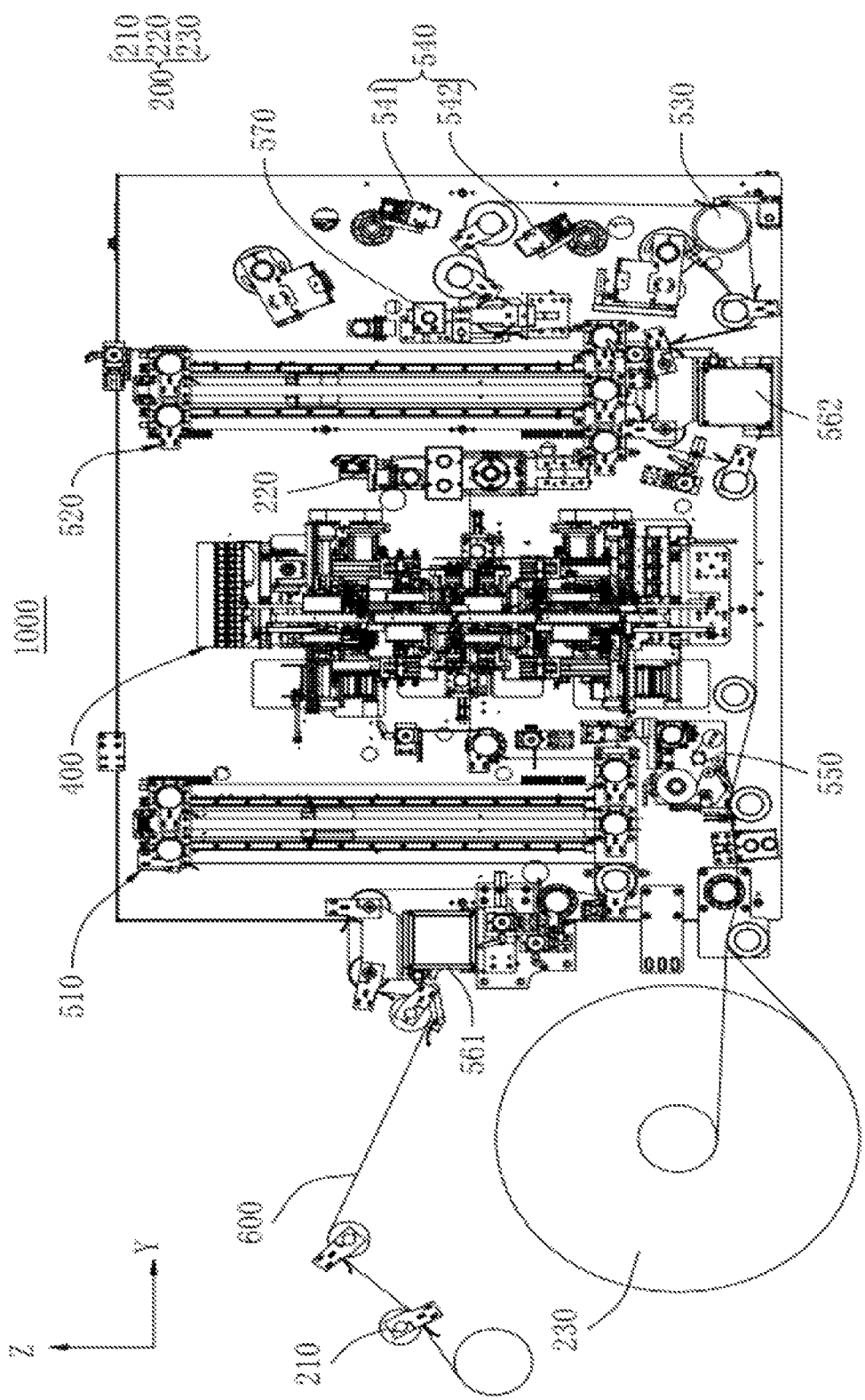
FIG. 2 is a structural schematic diagram of a film laminating apparatus provided in an embodiment of the present application from another perspective.

As shown in FIGS. 1 and 2, in an embodiment of the present application, a film laminating apparatus 1000 is provided, including a frame 100, a conveying mechanism 200, a mounting plate 300, and a plurality of film laminating mechanisms 400. The plurality of film laminating mechanisms 400 are mounted on the mounting plate 300. The conveying mechanism 200 is mounted on the frame 100 and is capable of conveying an electrode sheet 600 in a first direction (Y-axis) into the film laminating apparatus 1000. The mounting plate 300 is mounted on the frame 100 and forms an included angle with the first direction.

The frame 100 is a mounting substrate of the film laminating apparatus 1000, is used for mounting the conveying mechanism 200, the mounting plate 300, and the plurality of film laminating mechanisms 400, and plays a role in supporting the conveying mechanism 200, the mounting plate 300, and the plurality of film laminating mechanisms 400.

The conveying mechanism 200 is a mechanism component for conveying the electrode sheet 600.

The mounting plate 300 is a plate component for mounting the film laminating mechanisms 400.

The film laminating mechanisms 400 are mechanism components for laminating protective films to the electrode sheet 600.

The conveying mechanism 200 is mounted on the frame 100 and can convey the electrode sheet 600 into the film laminating apparatus 1000 in the first direction. It can be understood that during the process of conveying the electrode sheet 600 by the conveying mechanism 200, the direction of the electrode sheet 600 may be variable or unchanged. The first direction refers to the conveying direction of the electrode sheet 600 in the film laminating mechanism 400. The direction of the electrode sheet 600 conveyed by the conveying mechanism 200 may be selected based on an actual conveying route, which is not limited herein.

The mounting plate 300 is mounted on the frame 100 and forms an included angle with the first direction. It can be understood that the mounting plate 300 is not arranged parallel to the first direction, so that the mounting plate 300 is tilted or vertically arranged relative to the first direction.

When the film laminating apparatus 1000 of this embodiment of the present application is assembled, the plurality of film laminating mechanisms 400 are mounted on the mounting plate 300, and then the mounting plate 300 is mounted on the frame 100 in a manner of forming a certain included angle with the first direction. Alternatively, first the mounting plate 300 is mounted on the frame 100 in a manner of forming a certain included angle with the first direction, and then the plurality of film laminating mechanisms 400 are mounted on the mounting plate 300. The mounting plate 300 of the film laminating apparatus 1000 mounted in such a manner is not parallel to the first direction, so that the plurality of film laminating mechanisms 400 are tilted or vertically arranged relative to the conveying direction of the electrode sheet 600. Therefore, the space occupied by the plurality of film laminating mechanisms 400 in the conveying direction of the electrode sheet 600 is reduced, the size of the film laminating apparatus 1000 in the conveying direction of the electrode sheet 600 is reduced, the volume of the film laminating apparatus 1000 in the conveying direction of the electrode sheet 600 is reduced, and the space occupied by the film laminating apparatus 1000 in the conveying direction of the electrode sheet 600 is reduced.

As shown in FIGS. 1 and 2, in the film laminating apparatus 1000 provided in another embodiment of the present application, the included angle between the mounting plate 300 and the first direction is 85° to 95°.

In the film laminating apparatus 1000 of this embodiment of the present application, the included angle between the mounting plate 300 and the first direction is set within the above range, and the mounting plate 300 is nearly perpendicular to the first direction. Therefore, the space occupied by the plurality of film laminating mechanisms 400 in the first direction is smaller, the size of the film laminating apparatus 1000 in the conveying direction of the electrode sheet 600 can be effectively reduced, the volume of the film laminating apparatus 1000 in the conveying direction of the electrode sheet 600 is reduced, and the space occupied by the film laminating apparatus 1000 in the conveying direction of the electrode sheet 600 is reduced.

In an embodiment, the included angle between the mounting plate 300 and the first direction may be 85°, 86°, 87°, 88°, 89°, 90°, 91°, 92°, 93°, 94°, or 95°.

As shown in FIGS. 1 and 2, in the film laminating apparatus 1000 provided in another embodiment of the present application, the mounting plate 300 is arranged perpendicular to the first direction.

The mounting plate 300 is arranged perpendicular to the first direction. It can be understood that the included angle formed between the mounting plate 300 and the first direction is 90°.

In the film laminating apparatus 1000 of this embodiment of the present application, the mounting plate 300 is arranged perpendicular to the first direction. Therefore, the space occupied by the plurality of film laminating mechanisms 400 in the first direction is maximally reduced, the size of the film laminating apparatus 1000 in the conveying direction of the electrode sheet 600 is maximally reduced, the volume of the film laminating apparatus 1000 in the conveying direction of the electrode sheet 600 is maximally reduced, and the space occupied by the film laminating apparatus 1000 in the conveying direction of the electrode sheet 600 is maximally reduced.

Figure 3:
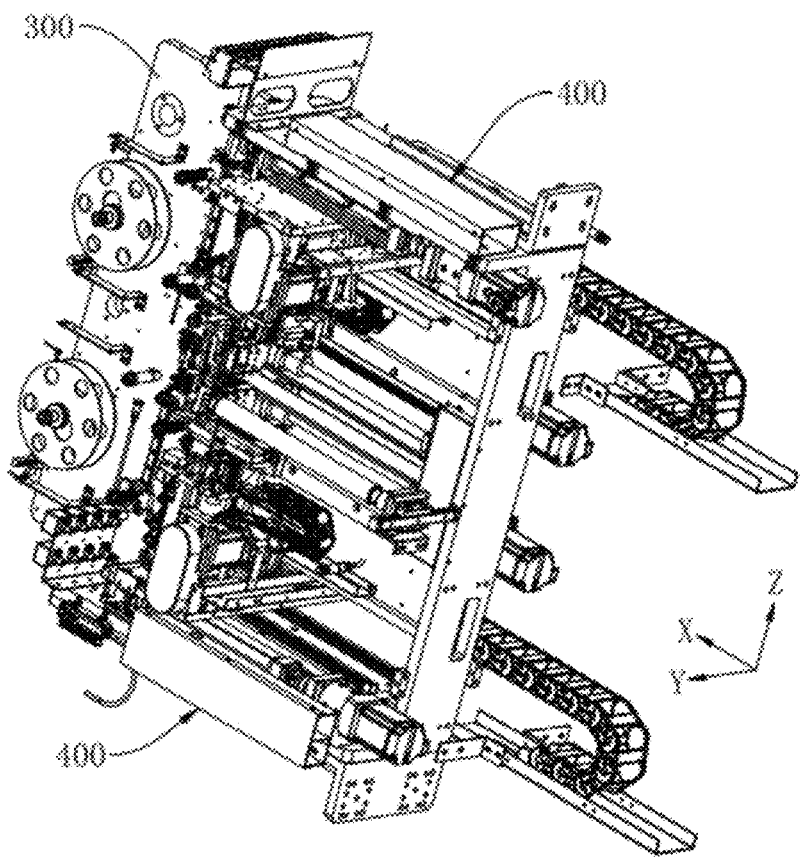
FIG. 3 is a structural schematic diagram of a mounting plate and a plurality of film laminating mechanisms in FIG. 2.

As shown in FIG. 3, in the film laminating apparatus 1000 provided in another embodiment of the present application, the number of the film laminating mechanisms 400 is two, and the two film laminating mechanisms 400 are distributed in the height direction (Z-axis) of the mounting plate 300 and used for laminating films on the opposite two surfaces of the electrode sheet 600 respectively.

When the film laminating apparatus 1000 of this embodiment of the present application performs film lamination, the electrode sheet 600 passes through the two film laminating mechanisms 400 arranged vertically, and the two film laminating mechanisms 400 simultaneously laminate films to the upper and lower surfaces at the corner of the electrode sheet 600, thereby improving the film laminating efficiency. In addition, the two film laminating mechanisms 400 are positioned above and below the electrode sheet 600 respectively, and cannot occupy much space in the conveying direction of the electrode sheet 600, so that the film laminating apparatus 1000 has a relatively compact structure and small volume.

Figure 4:
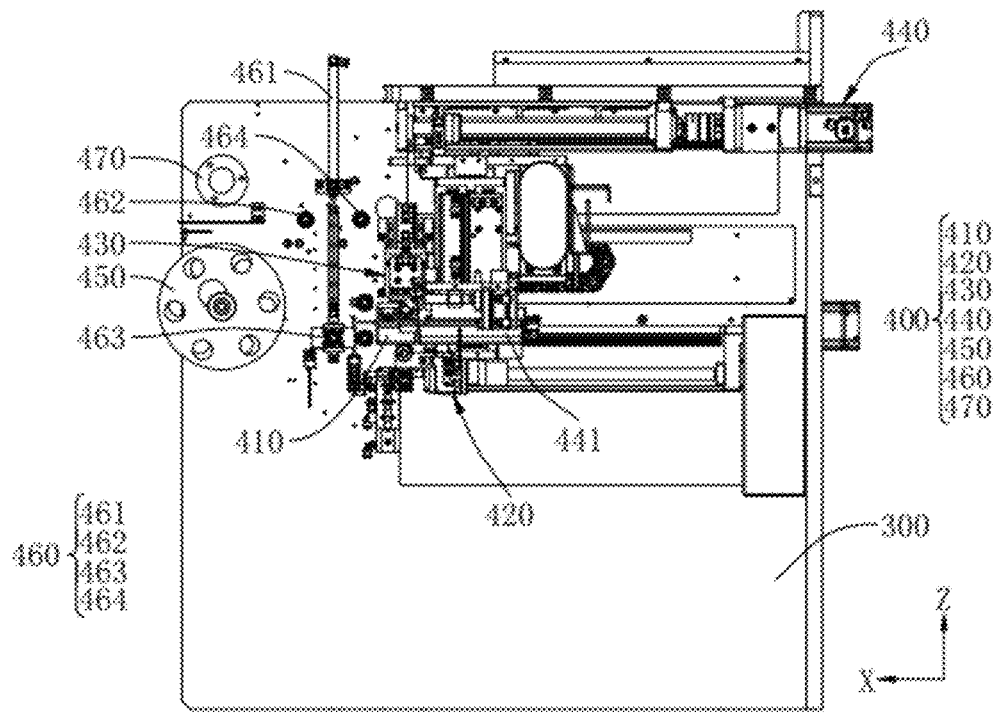
FIG. 4 is a structural schematic diagram of a mounting plate and a film laminating mechanism in FIG. 3 from one perspective.
Figure 5:
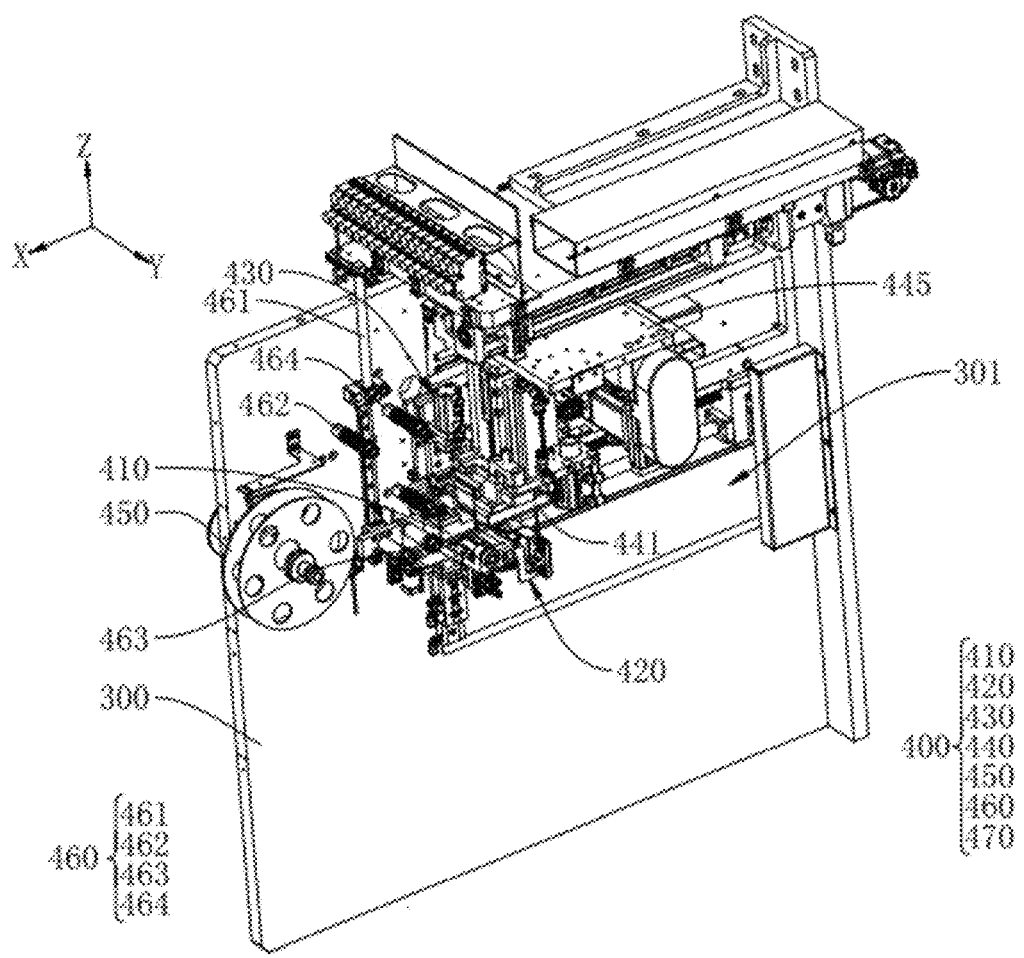
FIG. 5 is a structural schematic diagram of the mounting plate and the film laminating mechanism in FIG. 3 from another perspective.

In the film laminating apparatus 1000 provided in another embodiment of the present application, as shown in FIGS. 4 and 5, the film laminating mechanism 400 includes a first film suction member 410, a film pulling module 420, a film cutting module 430, and a film laminating module 440. The first film suction member 410, the film pulling module 420, the film cutting module 430, and the film laminating module 440 are mounted on the mounting plate 300. The first film suction member 410 is used for sucking a protective film. The film laminating module 440 includes a second film suction member 441, and the first film suction member 410 and the second film suction member 441 are arranged apart. The film pulling module 420 is used for pulling the protective film from the first film suction member 410 onto the second film suction member 441. The film cutting module 430 is used for cutting the protective film between the first film suction member 410 and the second film suction member 441.

The first film suction member 410 is a component capable of sucking the protective film. For example, a plurality of vacuum holes are formed in the first film suction member 410, and a vacuum generator is used for vacuuming the vacuum holes, so that the vacuum holes suck the protective film, and fix the protective film onto the first film suction member 410. When the vacuum generator stops vacuuming the vacuum holes, the vacuum holes have no suction effect on the protective film, and the protective film may be detached from the first film suction member 410, thereby facilitating the film pulling module 420 to pull the protective film from the first film suction member 410 to the second film suction member 441.

The film pulling module 420 is a component capable of pulling the protective film to move, so that the protective film is pulled from the first film suction member 410 to the second film suction member 441.

The film cutting module 430 is a component capable of cutting off the protective film.

The film laminating module 440 is a component capable of laminating a protective film to the electrode sheet 600.

The second film suction member 441 is a component capable of sucking the protective film in the film laminating module 440. For example, a plurality of vacuum holes are formed in the second film suction member 441, and a vacuum generator is used for vacuuming the vacuum holes, so that the vacuum holes suck the protective film, and fix the protective film onto the second film suction member 441. When the vacuum generator stops vacuuming the vacuum holes, the vacuum holes have no suction effect on the protective film, and the protective film may be detached from the second film suction member 441, so that the protective film can be transferred from the second film suction member 441 to the electrode sheet 600.

In the film laminating apparatus 1000 of this embodiment of the present application, the protective film is sucked on the first film suction member 410, the film pulling module 420 pulls the protective film from the first film suction member 410 onto the second film suction member 441 of the film laminating apparatus 1000, the film cutting module 430 disconnects the protective film between the first film suction member 410 and the second film suction member 441, and the second film suction member 441 sucks and fixes the protective film and then adheres the protective film onto the electrode sheet 600. In this manner, lamination of the protective film at the corner of the electrode sheet 600 is completed.

In the film laminating apparatus 1000 provided in another embodiment of the present application, as shown in FIGS. 4 and 5, the film laminating mechanism 400 further includes an unwinding reel 450, a damper 470, and a temporary-storage film feeding mechanism 460. The unwinding reel 450, the damper 470, and the temporary-storage film feeding mechanism 460 are mounted on the mounting plate 300. The damper 470 is used for winding the protective film unwound by the unwinding reel 450. The temporary-storage film feeding mechanism 460 is used for temporarily storing the protective film drawn out from the damper 470, tensioning the protective film, and then introducing the protective film to the first film suction member 410.

The unwinding reel 450 is a component for winding the protective film.

The damper 470 is a component for providing a certain resistance for conveying of the protective film.

The temporary-storage film feeding mechanism 460 is a component capable of temporarily storing the protective film and providing the protective film under a certain tension to the first film suction member 410.

In the film laminating apparatus 1000 of this embodiment of the present application, the protective film drawn out from the unwinding reel 450 is wound around the damper 470 and the temporary-storage film feeding mechanism 460, and then is sucked onto the first film suction member 410. Before the film pulling module 420 pulls the protective film from the first film suction member 410 to the second film suction member 441 of the film laminating apparatus 1000, the temporary-storage film feeding mechanism 460 is started to drive the unwinding reel 450 to rotate and release the protective film. The released protective film is temporarily stored in the temporary-storage film feeding mechanism 460 after passing through the damper 470, and during this process, the damper 470 can provide a certain resistance to the movement of the protective film, thereby preventing the protective film from becoming superfluous and loose and falling. Only when the pulling force of the film pulling module 420 on the protective film is greater than the tension force provided by the temporary-storage film feeding mechanism 460 on the protective film, the film pulling module 420 can pull the protective film to move to the second film suction member 441. During this process, one end of the protective film at the first film suction member 410 is subjected to the pulling force from the film pulling module 420, and the other end is subjected to a tensioning force from the temporary-storage film feeding mechanism 460. Therefore, the protective film at the first film suction member 410 is in a tensioned state, and the protective film is evenly sucked on the first film suction member 410, so that the defects such as bubbles and wrinkles in the protective film sucked by the first film suction member 410 are reduced, and the laminated film quality is improved. Moreover, the protective film at the first film suction member 410 is in a tensioned state, so the protective film cannot become superfluous or loose, ensuring that the length of every section of the protective film is consistent after the film cutting module 430 cuts the protective film into sections, reducing the risk of undesirable film size and also improving the laminated film quality.

Figure 6:
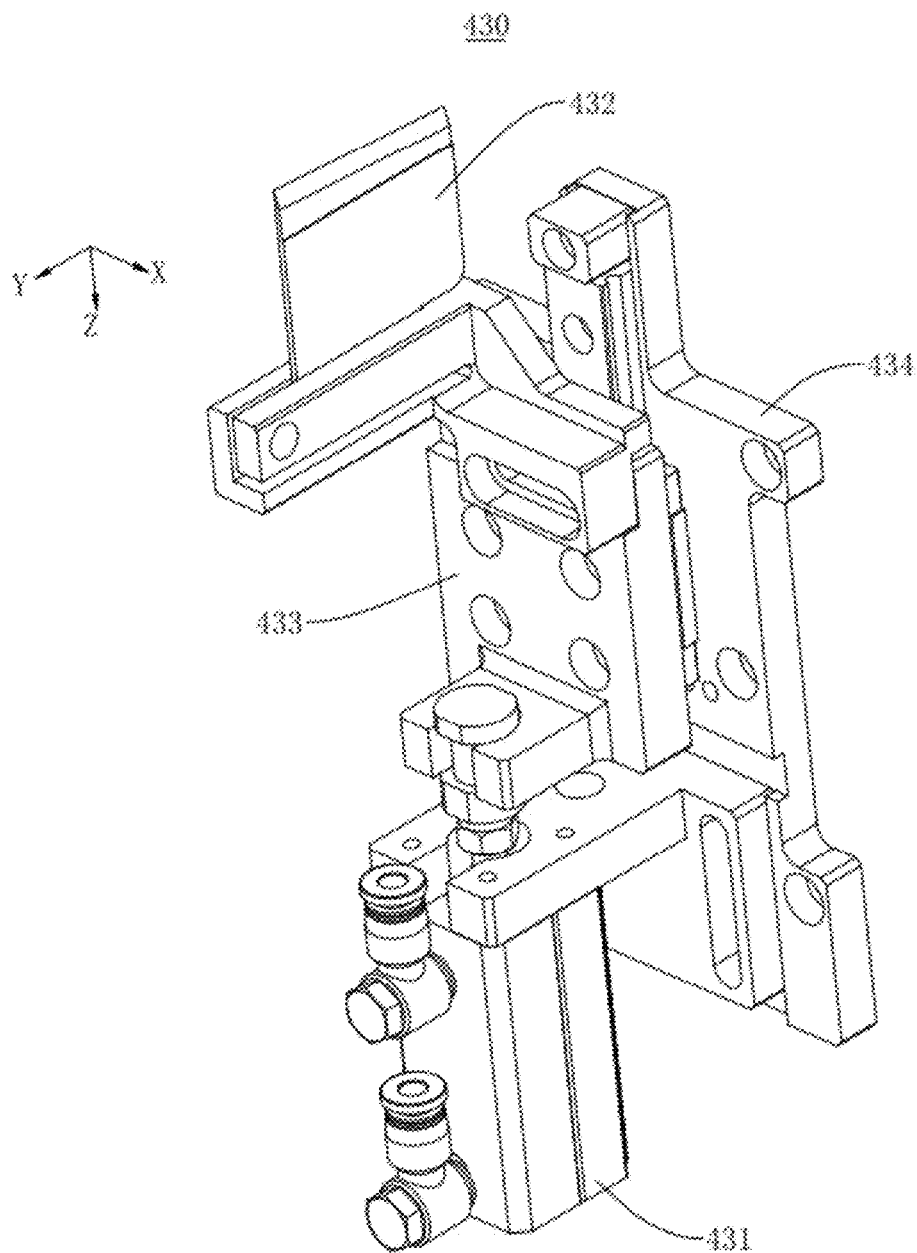
FIG. 6 is a structural schematic diagram of a film cutting module in FIG. 4.

In the film laminating apparatus 1000 provided in another embodiment of the present application, as shown in FIGS. 5 and 6, the temporary-storage film feeding mechanism 460 includes a lift cylinder 461, a first temporary-storage roller 462, a second temporary-storage roller 463, and a conveying roller 464. The lift cylinder 461, the first temporary-storage roller 462, the second temporary-storage roller 463, and the conveying roller 464 are mounted on the mounting plate 300. The first temporary-storage roller 462 and the conveying roller 464 are arranged above the second temporary-storage roller 463. The first temporary-storage roller 462, the second temporary-storage roller 463, and the conveying roller 464 are used for winding the protective film outputted by the damper 470 in sequence. The conveying roller 464 is used for guiding the protective film to the first film suction member 410. A piston rod of the lift cylinder 461 is connected to the second temporary-storage roller 463 and used for driving the second temporary-storage roller 463 to move downwards.

The lift cylinder 461 is a cylinder capable of driving the second temporary-storage roller 463 to move downwards.

The first temporary-storage roller 462 is a roller for winding the protective film conveyed by the damper 470.

The second temporary-storage roller 463 is a roller for winding the protective film drawn out from the first temporary-storage roller 462.

The conveying roller 464 is a roller for winding the protective film drawn out from the second temporary-storage roller 463 and guiding the protective film to the first film suction member 410.

The first temporary-storage roller 462, the second temporary-storage roller 463, and the conveying roller 464 are used for winding the protective film outputted by the damper 470 in sequence. The conveying roller 464 is used for guiding the protective film to the first film suction member 410. It can be understood that the protective film released from a winding reel is wound around the damper 470, wound from the top of the first temporary-storage roller 462 to the bottom of the second temporary-storage roller 463, and then wound from the bottom of the second temporary-storage roller 463 to the top of the conveying roller 464, and finally is sucked on the first film suction member 410.

When the film laminating apparatus 1000 of this embodiment of the present application is operated, the lift cylinder 461 is started to drive the second temporary-storage roller 463 to move downwards, and the distance between the first temporary-storage roller 462 and the second temporary-storage roller 463 as well as the distance between the second temporary-storage roller 463 and the conveying roller 464 increase, so that the protective film is pulled to unwind the winding reel. The unwound protective film passes through the damper 470 and then is be temporarily stored between the first temporary-storage roller 462 and the second temporary-storage roller 463 as well as between the second temporary-storage roller 463 and the conveying roller 464. After the protective film is temporarily stored, the lift cylinder 461 is closed. The second temporary-storage roller 463 pulls the protective film between the first temporary-storage roller 462 and the conveying roller 464 to move downwards under the gravity action of the second temporary-storage roller 463, thereby tensioning the protective film between the first temporary-storage roller 462 and the first film suction member 410. When the pulling force of the film pulling module 420 on the protective film is greater than the gravity of the second temporary-storage roller 463, the film pulling module 420 pulls the protective film to move towards the second film suction member 441. At this point, one end of the protective film at the first film suction member 410 is pulled by the film pulling module 420, and the other end is subjected to the gravity action of the second temporary-storage roller 463, such that the protective film at the first film suction member 410 is tensioned.

In another embodiment, as shown in FIG. 6, the film cutting module 430 includes a film cutting connecting plate 434, a film cutting connecting rack 433, a film cutting driving member 431, and a film cutting knife 432. The film cutting connecting plate 434 is mounted on the mounting plate 300, and the film cutting driving member 431 is mounted on the film cutting connecting plate 434. The film cutting driving member 431 is connected to the film cutting knife 432 through the film cutting connecting rack 433, and can drive the film cutting knife 432 to extend into a gap between the first film suction member 410 and the second film suction member 441, thereby cutting off the protective film. The film cutting connecting rack 433 is slidably mounted on the film cutting connecting plate 434 through a linear guide rail. The film cutting driving member 431 drives the film cutting connecting rack 433 to move along the linear guide rail, thereby driving the film cutting knife 432 to extend into or exit from the gap between the first film suction member 410 and the second film suction member 441. Guided by the linear guide rail, the movement of the film cutting connecting rack 433 is stable and reliable, the movement of the film cutting knife 432 is stable and reliable, the cut edge of the protective film is smooth, and the film laminating effect of the electrode sheet 600 is desirable. For example, the film cutting driving member 431 may be a component, e.g. a cylinder or a linear module, capable of performing telescopic motion.

Figure 7:
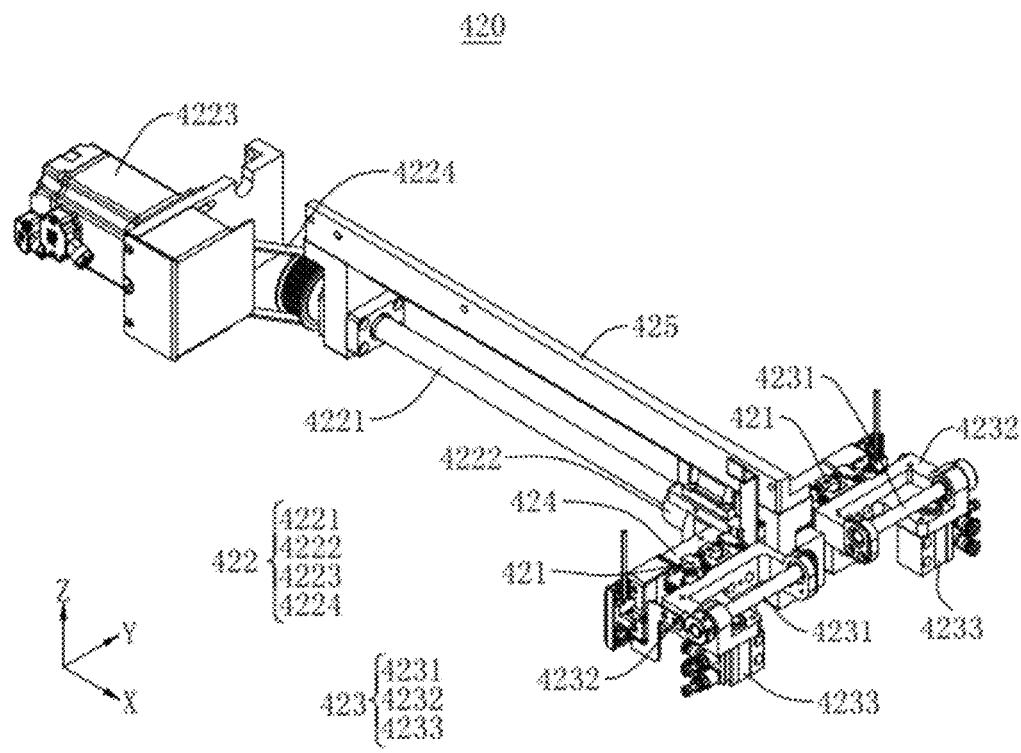
FIG. 7 is a structural schematic diagram of a film pulling module in FIG. 4.

In the film laminating apparatus 1000 provided in another embodiment of the present application, as shown in FIGS. 5 and 7, the film pulling module 420 includes a first film pulling driving member 421, a second film pulling driving member 422, and a film adhering assembly 423. The film adhering assembly 423 is used for adhering a protective film. The first film pulling driving member 421 is connected to the film adhering assembly 423 and used for driving the film adhering assembly 423 to abut against the protective film on the first film suction member 410, so that the protective film is adhered to the film adhering assembly 423. The second film pulling driving member 422 is mounted on the mounting plate 300, connected to the first film pulling driving member 421, and used for driving the film adhering assembly 423 to move in a direction from the first film suction member 410 to the second film suction member 441, thereby transferring the protective film adhered to the film adhering assembly 423 to the second film suction member 441.

The film adhering assembly 423 is a component capable of adhering the protective film.

The first film pulling driving member 421 is a power component for driving the film adhering assembly 423 to abut against the protective film on the first film suction member 410. For example, the first film pulling driving member 421 may be a component, e.g. a cylinder or a linear module, capable of performing telescopic motion.

The second film pulling driving member 422 is a power component for driving the first film pulling driving member 421 and the film adhering assembly 423 to move in the direction from the first film suction member 410 to the second film suction member 441. For example, the second film pulling driving member 422 may be a component, e.g. a cylinder or a linear module, capable of performing telescopic motion.

In the film laminating apparatus 1000 of this embodiment of the present application, the second film pulling driving member 422 moves the first film pulling driving member 421 and the film adhering assembly 423 to the first film suction member 410, and the first film pulling driving member 421 drives the film adhering assembly 423 to move towards the protective film on the first film suction member 410. When the film adhering assembly 423 abuts against the protective film on the first film suction member 410, the protective film is adhered to the film adhering assembly 423, the first film pulling driving member 421 drives the film adhering assembly 423 to move away from the first film suction member 410, and the film adhering assembly 423 drives the protective film to detach from the first film suction member 410. The second film pulling driving member 422 then drives the first film pulling driving member 421 and the film adhering assembly 423 to move together towards the second film suction member 441. When the film adhering assembly 423 moves to the second film suction member 441, the first film pulling driving member 421 drives the film adhering assembly 423 to move towards the second film suction member 441. After the second film suction member 441 sucks the protective film on the film adhering assembly 423, the first film pulling driving member 421 drives the film adhering assembly 423 to move away from the second film suction member 441, so that the film adhering assembly 423 is detached from the protective film. In this manner, the protective film is transferred from the first film suction member 410 to the second film suction member 441.

In the film laminating apparatus 1000 provided in another embodiment of the present application, as shown in FIGS. 5 and 7, the film adhering assembly 423 includes a film adhering roller 4231, a film adhering mounting rack 4232, and an abutting telescopic member 4233. The film adhering roller 4231 is rotatably mounted on the film adhering mounting rack 4232 and used for adhering the protective film. The abutting telescopic member 4233 is mounted on the film adhering mounting rack 4232, and a telescopic end of the abutting telescopic member 4233 is used for abutting against the film adhering roller 4231 to prevent the film adhering roller 4231 from rotating. The first film pulling driving member 421 is connected to the film adhering mounting rack 4232.

The film adhering roller 4231 is a roller for adhering the protective film. For example, the outer wall of the film adhering roller 4231 is provided with a bonding adhesive layer used for bonding the protective film. The bonding adhesive layer may be formed by wrapping a bonding adhesive, a double sided adhesive tape or the like on the outer wall of a bonding roller.

The film adhering mounting rack 4232 is a rack structure for mounting the film adhering roller 4231, and the film adhering mounting rack 4232 plays a role in supporting and fixing the film adhering roller 4231.

The abutting telescopic member 4233 is a component capable of driving the telescopic end thereof to move back and forth. For example, the abutting telescopic member 4233 is a component such as a cylinder and oil cylinder.

When the film laminating apparatus 1000 of this embodiment of the present application is operated, the first film pulling driving member 421 drives a film adhering rack and the film adhering roller 4231 towards the first film suction member 410. After the film adhering roller 4231 abuts against the protective film, the telescopic end of the abutting telescopic member 4233 is detached from the film adhering roller 4231. At the same time, the second film pulling driving member 422 drives the first film pulling driving member 421 to move in the direction from the second film suction member 441 to the first film suction member 410, and the film adhering roller 4231 rolls on the first film suction member 410, so that the protective film is adhered to the film adhering roller 4231. The area where the protective film is adhered to the film adhering roller 4231 is large, and the protective film can be stably and reliably adhered to the film adhering roller 4231, thereby ensuring that the film pulling module 420 can stably pull the protective film to the second film suction member 441. After the protective film is wound and adhered to the film adhering roller 4231, the telescopic end of the abutting telescopic member 4233 extends and abuts against the film adhering roller 4231. The first film pulling driving member 421 drives the film adhering roller 4231 to move away from the first film suction member 410, so that the protective film is detached from the first film suction member 410. The second film pulling driving member 422 then drives the first film pulling driving member 421 and the film adhering roller 4231 to move towards the second film suction member 441. When the film adhering roller 4231 moves to the second film suction member 441, the first film pulling driving member 421 drives the protective film on the film adhering roller 4231 to abut against the second film suction member 441. At the same time, the second film pulling driving member 422 continues to drive the film adhering roller 4231 to move in the direction from the first film suction member 410 to the second film suction member 441, thereby pulling a longer protective film to the second film suction member 441 to ensure that the second film suction member 441 has a larger suction area. Moreover, after the film cutting module 430 sucks the protective film between the first film suction member 410 and the second film suction member 441, the second film pulling driving member 422 continues to drive the film adhering roller 4231 to move in the direction from the first film suction member 410 to the second film suction member 441, so that the part of the cut protective film between the first film suction member 410 and the second film suction member 441 can also move to the second film suction member 441 and be sucked by the second film suction member 441. In this way, it is ensured that after the second film suction member 441 sucks the entire section of protective film at a large area, the protective film can be smoothly adhered to the electrode sheet 600 subsequently. After the second film suction member 441 sucks the entire section of protective film at a large area, the first film pulling driving member 421 drives the film adhering roller 4231 to move away from the second film suction member 441 and detach the film adhering roller 4231 from the protective film, so that the protective film is transferred from the first film suction member 410 to the second film suction member 441. The telescopic end of the abutting telescopic member 4233 extends and abuts against the film adhering roller 4231 to limit the rotation of the film adhering roller 4231, thereby preventing the protective film from falling off from the film adhering roller 4231 due to the rotation of the film adhering roller 4231 in the subsequent process of driving the film adhering roller 4231 to move by the first film pulling driving member 421 and the second film pulling driving member 422 to pull the protective film to move, and ensuring that the protective film can be stably and reliably pulled from the first film suction member 410 to the second film suction member 441.

In another embodiment, as shown in FIGS. 5 and 7, the film pulling module 420 further includes a film pulling connecting rack 424, and a plurality of first film pulling driving members 421 and a plurality of film adhering assemblies 423 are arranged. The first film pulling driving members 421 are connected to the film adhering assemblies 423 one by one, and each first film pulling driving member 421 is mounted on the film pulling connecting rack 424. The second film pulling driving member 422 is connected to the film pulling connecting rack 424 and used for driving the film pulling connecting rack 424 to move in the direction from the first film suction member 410 to the second film suction member 441, thereby driving all the film adhering assemblies 423 to move. In addition, a plurality of film adhering assemblies 423 are arranged, and the film laminating apparatus 1000 may simultaneously adhere a plurality of protective films and cooperate with a plurality of second film suction members 441 to improve the film laminating efficiency.

In another embodiment, as shown in FIGS. 5 and 7, the film pulling module 420 further includes a film pulling connecting plate 425 mounted on the mounting plate 300. The second film pulling driving member 422 includes a film pulling motor 4223, a film pulling screw rod 4221, a film pulling sliding sleeve 4222, and a transmission assembly 4224. The film pulling motor 4223 is mounted on the film pulling connecting plate 425, and the film pulling screw rod 4221 is rotatably mounted on the film pulling connecting plate 425. The film pulling sliding sleeve 4222 sleeves outside the film pulling screw rod 4221 and is screwed with the film pulling screw rod 4221. The film pulling sliding sleeve 4222 is connected to the film pulling connecting rack 424. The output shaft of the film pulling motor 4223 is connected to the film pulling screw rod 4221 through the transmission assembly 4224. The rotational power outputted by the output shaft of the film pulling motor 4223 is transmitted to the film pulling screw rod 4221 through the transmission assembly 4224, and drives the film pulling screw rod 4221 to rotate. The film pulling screw rod 4221 rotates to drive the film pulling sliding sleeve 4222 to move in the length direction of the film pulling screw rod 4221. The film pulling sliding sleeve 4222 drives the film pulling connecting rack 424 to move, thereby driving the film adhering roller 4231 to move from the first film suction member 410 to the second film suction member 441. The transmission assembly 4224 may be a pulley transmission assembly 4224, a gear transmission assembly 4224, or the like.

Figure 8:
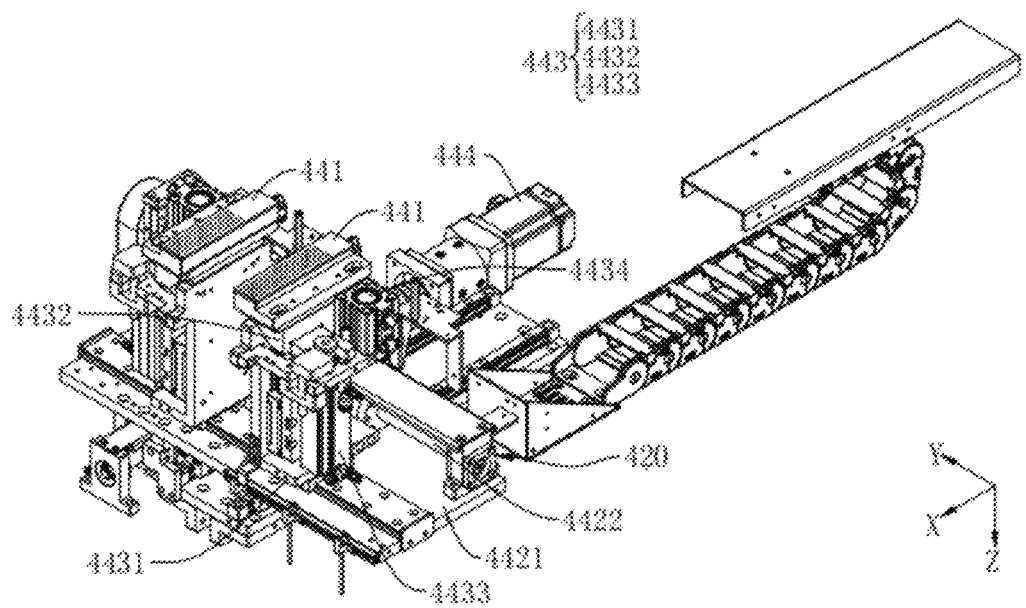
FIG. 8 is a structural schematic diagram of a film laminating module in FIG. 4.

In the film laminating apparatus 1000 provided in another embodiment of the present application, as shown in FIGS. 5 and 8, the film laminating module 440 further includes an adjustment driving assembly 442 and a plurality of connecting assemblies 443. The adjustment driving assembly 442 is connected to the mounting plate 300, and each connecting assembly 443 is connected to the second film suction member 441. All the connecting assemblies 443 are distributed at intervals, each connecting assembly 443 is connected to the adjustment driving assembly 442, and the adjustment driving assembly 442 is used for driving two adjacent connecting assemblies 443 to be close to or far away from each other.

The connecting assembly 443 is a connecting component connected between the adjustment driving assembly 442 and the second film suction member 441.

The adjustment driving assembly 442 is a power component for driving two adjacent connecting assemblies 443 to be close to or far away from each other.

In the film laminating apparatus 1000 of this embodiment of the present application, the distance between two adjacent connecting assemblies 443 may be adjusted by the adjustment driving assembly 442 to adjust the distance between two adjacent second film suction members 441, thereby meeting the requirements of film lamination at different positions on different electrode sheets 600. In addition, the film laminating mechanism 400 uses a single film laminating module 440 to achieve film lamination at a plurality of positions on the electrode sheet 600 without the need for a plurality of film laminating modules 440, such that the volume of the whole film laminating apparatus 1000 is greatly reduced and the space occupation is reduced.

In the film laminating apparatus 1000 provided in another embodiment of the present application, as shown in FIGS. 5 and 8, the connecting assembly 443 includes a first connecting rack 4431, a second connecting rack 4432, a film laminating driving member 4433, and a temporary-storage driving member 4434. The first connecting rack 4431 is connected to the adjustment driving assembly 442. The film laminating driving member 4433 is mounted on the first connecting rack 4431. The second film suction member 441 is mounted on the second connecting rack 4432. The film laminating driving member 4433 is connected to the second connecting rack 4432 and used for driving the second film suction member 441 to move towards the electrode sheet 600 in a second direction (Z-axis) to adhere the protective film sucked by the second film suction member 441 to the electrode sheet 600. The temporary-storage driving member 4434 is connected to the second connecting rack 4432 and the first connecting rack 4431, and used for driving the second film suction member 441 to move in the direction opposite to the second direction.

The first connecting rack 4431 is a rack structure connected between the film laminating driving member 4433 and the adjustment driving assembly 442. The first connecting rack 4431 is used as a mounting substrate of the film laminating driving member 4433 and plays a role in supporting and fixing the film laminating driving member 4433.

The second connecting rack 4432 is a rack structure connected between the film laminating driving member 4433 and the second film suction member 441. The second connecting rack 4432 is used as a mounting substrate of the temporary-storage driving member 4434 and the second film suction member 441, and plays a role in supporting and fixing the temporary-storage driving member 4434 and the second film suction member 441.

The film laminating driving member 4433 is a power component capable of driving the second film suction member 441 to move towards the electrode sheet 600 in the second direction. The film laminating driving member 4433 may be a cylinder, a linear module, or the like.

The temporary-storage driving member 4434 is a power component capable of driving the second film suction member 441 to move in the direction opposite to the second direction. The temporary-storage driving member 4434 may be a cylinder, a linear module, or the like.

When the film laminating apparatus 1000 of this embodiment of the present application performs film lamination, the film laminating driving member 4433 drives the second connecting rack 4432 and the second film suction member 441 to move towards the electrode sheet 600 in the second direction. After the second film suction member 441 abuts the protective film on the electrode sheet 600, the film laminating driving member 4433 moves the second film suction member 441 away from the electrode sheet 600 in the direction opposite to the second direction. At the same time, after the second film suction member 441 stops sucking the protective film, the protective film is left on the electrode sheet 600, so that the electrode sheet 600 is laminated with the film. During this process, before the film laminating driving member 4433 drives the second film suction member 441 to almost abut the protective film on the electrode sheet 600, the temporary-storage driving member 4434 is started to drive the second connecting rack 4432 to move in the direction opposite to the second direction, and thus a counterforce is formed between the film laminating driving member 4433 and the temporary-storage driving member 4434, thereby lowering the speed of the film laminating driving member 4433 approaching the electrode sheet 600 in the second direction, reducing the impact force between the second film suction member 441 and the electrode sheet 600, and reducing damage to the electrode sheet 600.

In another embodiment, as shown in FIGS. 5 and 8, the film laminating module 440 further includes a film laminating moving member 444 mounted on the mounting plate 300 and connected to the adjustment driving assembly 442. The film laminating moving member 444 is used for driving the adjustment driving assembly 442 and the second film suction member 441 to move, so that the second film suction member 441 moves from the first film suction member 410 to the corner of the electrode sheet 600, to facilitate subsequent lamination of the protective film. The film laminating moving member 444 is a linear module, a cylinder, or the like.

In another embodiment, the number of the connecting assemblies 443 is two, and the adjustment driving assembly 442 includes an adjustment connecting plate 4421, an adjustment screw rod 4422, a rotation driving member, and two sliding tables. The film laminating moving member 444 is connected with a mounting base. The adjustment screw rod 4422 is rotatably mounted on the mounting base. The adjustment screw rod 4422 is provided with two threads in the length direction. The direction of spiral of the two threads is opposite. The two sliding tables are respectively screwed with the two threads. The first connecting racks 4431 in the two connecting assemblies 443 are respectively connected with the two sliding tables. The rotation driving member is mounted on the mounting base, connected with the screw rod, and used for driving the screw rod to rotate. Because the direction of spiral of the two threads is opposite, the two sliding tables move close to or far away from each other in the length direction of the screw rod, thus driving the first connecting racks 4431 in the two connecting assemblies 443 to move close to or far away from each other, and further driving the two second film suction members 441 to move close to or far away from each other. The rotation driving member is a motor, or the like. A linear guide rail is arranged between the adjustment connecting plate 4421 and the first connecting racks 4431. Under the guidance of the linear guide rail, the movement of the first connecting racks 4431 is more stable and reliable, the position adjustment of the second film suction members 441 is more accurate, and the laminated film quality is desirable. In other embodiments, the adjustment driving assembly 442 may be a bidirectional cylinder, a positive and negative bidirectional linear module, or the like.

In another embodiment, as shown in FIG. 5, a perforated hole 301 is formed in the mounting plate 300, and the electrode sheet 600 passes through the perforated hole 301. An unwinding reel 450, a temporary-storage film feeding mechanism 460, a first film suction member 410, and a film cutting module 430 are arranged on each of the left and right sides of the mounting plate 300. Two connecting assemblies 443 are positioned on the opposite sides of the mounting plate 300. The film pulling connecting rack 424 passes through in the perforated hole 301. Two film adhering rollers 4231 are positioned on the left and right sides of the mounting plate 300, so as to adhere protective films on two first film suction assemblies, and transfer the two protective films to the second film suction members 441 connected to the two connecting assemblies 443. Then, after the distance between the two connecting assemblies 443 is adjusted to a preset distance by the adjustment driving member, the two connecting assemblies 443 drive the two second film suction members 441 to move towards the electrode sheet 600, so that the two protective films are laminated to two positions of the electrode sheet 600. In this manner, the electrode sheet 600 is laminated with films at a plurality of corners simultaneously, the film lamination efficiency is improved, and the space on the opposite sides of the mounting plate 300 is fully utilized, which is also conducive to reducing the volume of the film laminating apparatus 1000.

In another embodiment, the following description is an example of the components mounted on the right side of the mounting plate 300, specifically as follows:

As shown in FIG. 5, the first film suction member 410 and the second film suction member 441 are spaced front and back. The winding reel and the temporary-storage film feeding mechanism 460 are sequentially arranged front and back on the front side of the first film suction member 410. The film pulling module 420 is positioned below the first film suction member 410. The adjustment driving assembly 442 and two connecting assemblies 443 of the film laminating mechanism 400 are positioned above the second film suction member 441. The film cutting driving member 431 of the film cutting module 430 is positioned above the first film suction member 410. The film cutting knife 432 is positioned between the first film suction member 410 and the second film suction member 441.

The protective film drawn out from the unwinding reel 450 is adhered to the first film suction member 410 after passing through the damper 470 and the temporary-storage film feeding mechanism 460. When the protective film is to be temporarily stored, the lift cylinder 461 drives the second temporary-storage roller 463 to move downwards, the unwinding reel 450 rotates to unwind the protective film, and the protective film is temporarily stored in the temporary-storage film feeding mechanism 460 after passing through the damper 470 and the first temporary-storage roller 462. When the film is to be laminated, the first film suction member 410 sucks the protective film, the second film pulling driving member 422 drives the film adhering roller 4231 to move below the first film suction member 410, and the first film pulling driving member 421 drives the film adhering roller 4231 to move up and abut against the protective film. After the protective film is adhered to the bonding roller, the second film pulling driving member 422 drives the film adhering roller 4231 abutting against the protective film to roll and move forward, so that the protective film is wound and adhered to the film adhering roller 4231. The first film pulling driving member 421 then drives the bonding roller with the protective film adhered to move downwards. After the protective film is detached from the first film suction member 410, the second film pulling driving member 422 drives the film adhering roller 4231 to move backwards. At the same time, the telescopic section of the abutting telescopic member 4233 extends upwards to abut against the film adhering roller 4231 to prevent the film adhering roller 4231 from rotating. When the film adhering roller 4231 moves below the second film suction member 441, the first film pulling driving member 421 drives the film adhering roller 4231 to move upwards. When the film adhering roller 4231 abuts the protective film on the second film suction member 441, the second film pulling driving member 422 drives the film adhering roller 4231 to move back for a certain distance, and the film cutting driving member 431 drives the film cutting knife 432 to cut off the protective film. The second film pulling driving member 422 continues to drive the film adhering roller 4231 to move backwards until the cut protective film completely covers the second film suction member 441. The second film suction member 441 sucks the protective film, and the first film pulling driving member 421 moves downwards, causing the film adhering roller 4231 to detach from the protective film. The film laminating moving member 444 drives the second film suction member 441 to move backwards. When the second film suction member 441 moves above the electrode sheet 600, the film laminating driving member 4433 drives the second film suction member 441 to move downwards. When the film laminating driving member 4433 drives the second film suction member 441 to a certain position, the temporary-storage driving member 4434 is started. The temporary-storage driving member 4434 drives the second film suction member 441 to move upwards, forming a counterforce with the film laminating driving member 4433. Therefore, the downward movement speed of the second film suction member 441 is lowered, causing the second film suction member 441 to slowly move downwards, and slowly pressing the protective film onto the electrode sheet 600. In this way, the film is laminated at the corner of the electrode sheet 600.

The mounting method of the components on the left side of the mounting plate 300 is the same as that of the components on the right side of the mounting plate 300, which will not be further elaborated here. Of course, in other embodiments, the mounted components on the left and right sides of the mounting plate 300 may be the same or different, and are specifically arranged according to actual needs, which will not be further elaborated here.

As shown in FIGS. 1 and 2, the film laminating apparatus 1000 provided in another embodiment of the present application further includes a first temporary-storage mechanism 510. The conveying mechanism 200 includes a receiving assembly 210 and a drawing assembly 220. The first temporary-storage mechanism 510, the receiving assembly 210 and the drawing assembly 220 are mounted on the frame 100. The receiving assembly 210 is used for receiving the electrode sheet 600 conveyed by an external device. The first temporary-storage mechanism 510 is positioned between the receiving assembly 210 and the film laminating apparatus 1000. The receiving assembly 210 is positioned between the first temporary-storage mechanism 510 and the drawing assembly 220. The first temporary-storage mechanism 510 is used for temporarily storing the electrode sheet conveyed by the receiving assembly 210. The drawing assembly 220 is used for drawing and stopping continuous conveying of the electrode sheet 600 drawn out from the film laminating mechanism 400.

The receiving assembly 210 is a component for receiving the electrode sheet 600 conveyed by an external device, and introducing the electrode sheet 600 into the film laminating apparatus 1000. For example, the receiving assembly 210 may include a plurality of rollers, and the electrode sheet 600 is wound around the rollers and conveyed forward.

The first temporary-storage mechanism 510 is a mechanism component for receiving the electrode sheet 600 conveyed by the receiving assembly 210 and temporarily storing the electrode sheet 600.

The drawing assembly 220 is a component for driving and stopping continuous conveying of the electrode sheet 600.

In the film laminating apparatus 1000 of this embodiment of the present application, the electrode sheet 600 conveyed by the external device passes through the receiving assembly 210, the first temporary-storage mechanism 510, and the film laminating mechanism 400 before entering the drawing assembly 220. When the film laminating apparatus 1000 is operated, the drawing assembly 220 draws the electrode sheet 600 to convey the electrode sheet forward, and the electrode sheet 600 conveyed by the external device continuously passes through the receiving assembly 210 and the first temporary-storage mechanism 510, enters the film laminating mechanism 400 to be laminated, and then is conveyed by the drawing assembly 220 into a subsequent component.

In some cases, the external device continuously conveys the electrode sheet 600 to the receiving assembly 210, and the receiving assembly 210 also continuously conveys the electrode sheet 600 to the film laminating mechanism 400. As a result, the electrode sheet 600 in the film laminating mechanism 400 is in a forward conveying movement state, which may result in significant film laminating errors. To alleviate this problem, in the film laminating apparatus 1000 of this embodiment of the present application, the first temporary-storage mechanism 510 and the drawing assembly 220 are additionally arranged. When the film laminating mechanism 400 performs film lamination, the first temporary-storage mechanism 510 continuously temporarily stores the electrode sheet 600 conveyed by the receiving assembly 210, so that the electrode sheet 600 received by the receiving assembly 210 cannot be continuously conveyed into the film laminating mechanism 400. At the same time, the drawing assembly 220 stops conveying the electrode sheet 600 forward, so that the electrode sheet 600 drawn out from the film laminating mechanism 400 cannot be conveyed forward either. In this manner, the electrode sheet 600 in the film laminating mechanism 400 is in a static state, static film lamination of the electrode sheet 600 is achieved, the film laminating errors caused by the movement of the electrode sheet 600 are reduced, and precise film lamination of the electrode sheet 600 is achieved.

In another embodiment, the film laminating apparatus 1000 includes a first correcting member 561. The first correcting member 561 is arranged between the receiving assembly 210 and the first temporary-storage mechanism 510, and used for correcting the offset of the electrode sheet 600 conveyed by the receiving assembly 210, thereby ensuring that the electrode sheet 600 accurately enters the film laminating mechanism 400, reducing the film laminating errors, and improving the accuracy of film lamination. The first correcting member 561 is a traveling corrector, or the like.

Figure 9:
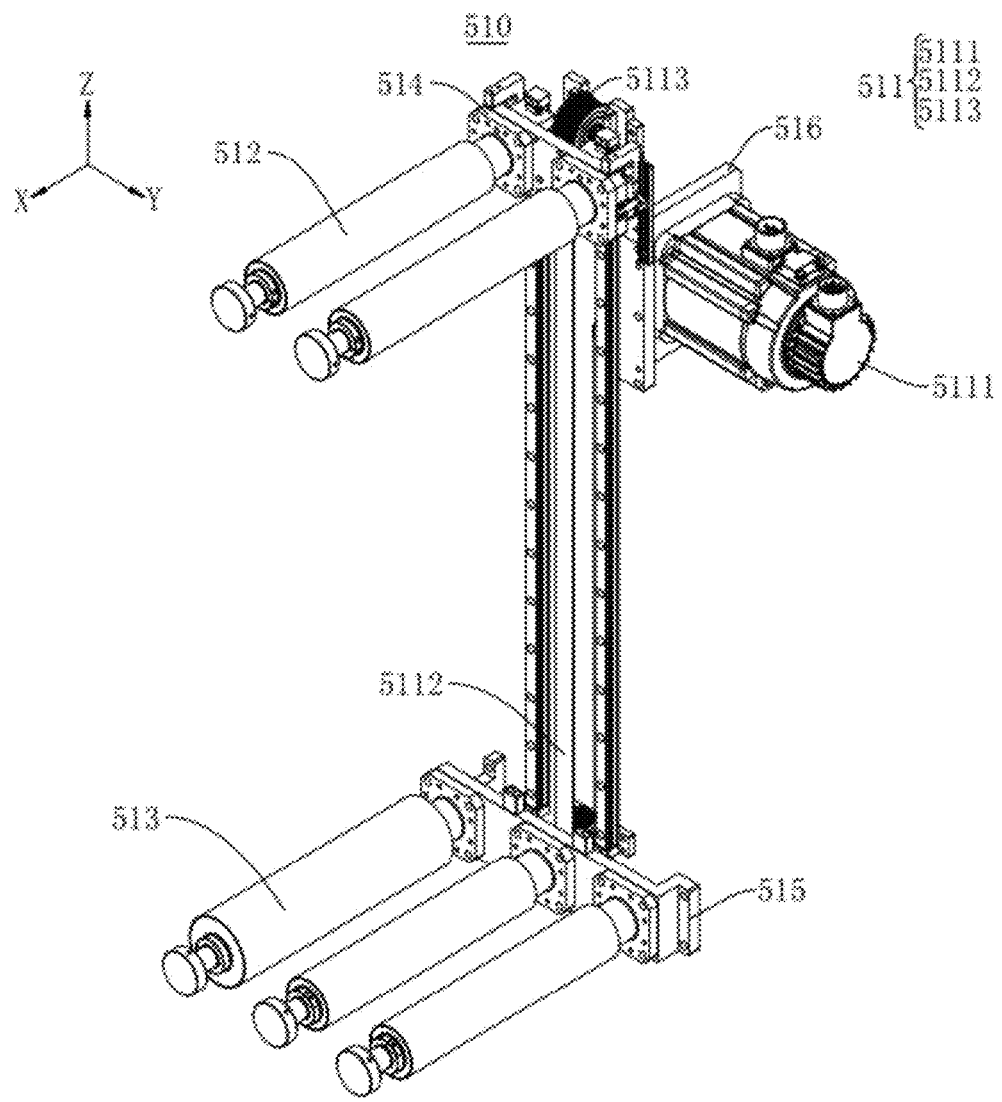
FIG. 9 is a structural schematic diagram of a first temporary-storage mechanism in FIG. 2.

As shown in FIGS. 3 and 9, in the film laminating apparatus 1000 provided in another embodiment of the present application, the first temporary-storage mechanism 510 includes a temporary-storage driving member 511, a third temporary-storage roller 512 for winding the electrode sheet 600, and a fourth temporary-storage roller 513 for winding the electrode sheet 600. The temporary-storage driving member 511 is mounted on the frame 100. The third temporary-storage roller 512 and the fourth temporary-storage roller 513 are connected to the temporary-storage driving member 511. The temporary-storage driving member 511 is used for driving the fourth temporary-storage roller 513 to move close to or away from the third temporary-storage roller 512.

The third temporary-storage roller 512 is a roller for winding the electrode sheet 600.

The fourth temporary-storage roller 513 is a roller for winding the electrode sheet 600.

The temporary-storage driving member 511 is a power component for driving the third temporary-storage roller 512 and the fourth temporary-storage roller 513 to be close to or far away from each other.

In the film laminating apparatus 1000 of this embodiment of the present application, the electrode sheet 600 conveyed by the receiving assembly 210 is wound on the third temporary-storage roller 512 and the fourth temporary-storage roller 513. When the film laminating apparatus 1000 starts performing film lamination, the temporary-storage driving member 511 drives the third temporary-storage roller 512 and the fourth temporary-storage roller 513 to be away from each other, so that the length of the electrode sheet 600 between the third temporary-storage roller 512 and the fourth temporary-storage roller 513 is increased. In this way, the electrode sheet 600 conveyed by the receiving assembly 210 is temporarily stored and cannot enter the film laminating mechanism 400, so that static film lamination within the film laminating mechanism 400 is achieved, and the accuracy of film lamination is improved.

In another embodiment, as shown in FIGS. 3 and 9, the first temporary-storage mechanism 510 further includes a first roller mounting base 514 and a second roller mounting base 515. A plurality of third temporary-storage rollers 512 are arranged on the first roller mounting base 514, a plurality of fourth temporary-storage rollers 513 are mounted on the second roller mounting base 515, and the electrode sheet 600 is wound back and forth on the third temporary-storage rollers 512 and the fourth temporary-storage rollers 513. The temporary-storage driving member 511 drives the first roller mounting base 514 and the second roller mounting base 515 to be close to or far away from each other, thereby temporarily storing the electrode sheet 600. Due to the arrangement of the third temporary-storage rollers 512 and the fourth temporary-storage rollers 513, the electrode sheet 600 is wound back and forth on the third temporary-storage rollers 512 and the fourth temporary-storage rollers 513, so that a longer electrode sheet 600 can be temporarily stored, and the requirement for temporarily storing the electrode sheet 600 for a longer time is met.

The temporary-storage driving member 511 includes a temporary-storage connecting rack 516, a temporary-storage motor 5111, a temporary-storage belt 5112, and two temporary-storage pulleys 5113. The temporary-storage connecting rack 516 is mounted on the frame 100. The temporary-storage motor 5111 is mounted on the temporary-storage connecting rack 516. The first roller mounting base 514 and the second roller mounting base 515 are both slidably mounted on the temporary-storage connecting rack 516 through linear guide rails. The two temporary-storage pulleys 5113 are rotatably mounted on the frame 100 and arranged apart in the extending direction of the linear guide rails. The temporary-storage belt 5112 is wound on the two temporary-storage pulleys 5113. The temporary-storage belt 5112 includes two parts, positioned on the opposite sides of the temporary-storage pulleys 5113. One part is connected to the first roller mounting base 514, and the other part is connected to the second roller mounting base 515. One of the two temporary-storage pulleys 5113 is connected to the output shaft of the temporary-storage motor 5111. The output shaft of the temporary-storage motor 5111 drives the temporary-storage pulley 5113 of the temporary-storage belt 5112 connected thereto to rotate, and the temporary-storage pulley 5113 of the temporary-storage belt 5112 drives the temporary-storage belt 5112 to rotate. At this point, the movement direction of the two parts on the temporary-storage belt 5112 is opposite, so that the first roller mounting base 514 and the second roller mounting base 515 are driven to be close to or far away from each other under the guidance of the linear guide rails, and the electrode sheet 600 is temporarily stored. Of course, in other embodiments, the temporary-storage driving member 511 may be a linear module, a cylinder, or the like.

In another embodiment, the film laminating apparatus 1000 includes a second tension detection member, used for detecting the tension of the electrode sheet 600 conveyed by the receiving assembly 210. If the second tension detection member detects that the tension of the electrode sheet 600 is less than a preset tension value, the temporary-storage driving member 511 drives the third temporary-storage roller 512 and the fourth temporary-storage roller 513 to be far away from each other, thereby tensioning the electrode sheet 600 and preventing the electrode sheet 600 from falling off the third temporary-storage roller 512 and the fourth temporary-storage roller 513. If the second tension detection member detects that the tension of the electrode sheet 600 is less than the preset tension value, the temporary-storage driving member 511 drives the third temporary-storage roller 512 and the fourth temporary-storage roller 513 to be close to each other, thereby reducing the tension of the electrode sheet 600 and preventing the electrode sheet 600 from breaking. The second tension detection member may be a pressure sensor, a pressure change sensor, or the like, and may be mounted on the frame 100 or in an external device, which can be specifically selected according to actual needs. The external device may be a die cutting apparatus, or the like.

In another embodiment, the drawing assembly 220 includes a drawing driving member, a driving roller, and a pressing roller, all of which are mounted on the frame 100. The drawing driving member is connected to the driving roller, and used for driving the driving roller to rotate. A gap is formed between the pressing roller and the driving roller for the electrode sheet 600 to pass through, and the distance between the pressing roller and the driving roller is slightly less than the thickness of the electrode sheet 600. The drawing driving member drives the driving roller to rotate, and the rotating driving roller drives the electrode sheet 600 to pass through the gap, so that the electrode sheet 600 is drawn and conveyed forward. The distance between the pressing roller and the driving roller is slightly smaller than the thickness of the electrode sheet 600. Therefore, the electrode sheet 600 laminated with the protective film can be squeezed by the pressing roller and the driving roller when passing through the gap, thereby compressing the protective film on the electrode sheet 600 and preventing detachment of the protective film from the electrode sheet 600. In addition, when the drawing driving member stops driving the driving roller to rotate, the driving roller and the pressing roller clamp the electrode sheet 600, thereby preventing the electrode sheet 600 from being continuously conveyed forward. The drawing driving member may be a motor, or the like.

As shown in FIGS. 1 and 2, the film laminating apparatus 1000 provided in another embodiment of the present application further includes a second temporary-storage mechanism 520, and the conveying mechanism 200 further includes a winding assembly 230. The second temporary-storage mechanism 520 and the winding assembly 230 are mounted on the frame 100, the second temporary-storage mechanism 520 is used for temporarily storing the electrode sheet 600 outputted by the drawing assembly 220, and the winding assembly 230 is used for winding the electrode sheet 600 outputted by the second temporary-storage mechanism 520.

The second temporary-storage mechanism 520 is a component for temporarily storing the electrode sheet 600 outputted by the drawing assembly 220.

The winding assembly 230 is used for winding the electrode sheet 600 outputted by the second temporary-storage mechanism 520. For example, the winding assembly 230 may be a winding reel, or the like.

In some cases, the winding assembly 230 continuously winds the electrode sheet 600. When the drawing assembly 220 stops conveying the electrode sheet 600, the winding assembly 230 may continue to wind and pull the electrode sheet 600, which may cause the electrode sheet 600 to break. To alleviate this problem, in the film laminating apparatus 1000 of this embodiment of the present application, the second temporary-storage mechanism 520 is additionally arranged. After the drawing assembly 220 stops conveying the electrode sheet 600, the second temporary-storage mechanism 520 conveys the temporarily stored electrode sheet 600 to the winding assembly 230, thereby preventing the winding assembly 230 from pulling the electrode sheet 600 and reducing the risk of breakage of the electrode sheet 600.

It should be noted that by designing the structures of the first temporary-storage mechanism 510 and the second temporary-storage mechanism 520 to be identical, the first temporary-storage mechanism 510 also temporarily stores the electrode sheet 600 in the same way, which will not be further elaborated here. Of course, in other embodiments, the structures of the first temporary-storage mechanism 510 and the second temporary-storage mechanism 520 may also be different.

As shown in FIGS. 1 and 2, the film laminating apparatus 1000 provided in another embodiment of the present application further includes a first tension detection member 530 mounted on the frame 100. The first tension detection member 530 is used for detecting the tension of the electrode sheet 600 outputted by the second temporary-storage mechanism 520, and electrically connected to the second temporary-storage mechanism 520.

The first tension detection member 530 is a component capable of detecting the tension of the electrode sheet 600.

The first tension detection member 530 is electrically connected to the second temporary-storage mechanism 520. It can be understood that the first tension detection member 530 may provide feedback signals to the second temporary-storage mechanism 520, thereby controlling the second temporary-storage mechanism 520 to temporarily store and output the electrode sheet 600.

In the film laminating apparatus 1000 of this embodiment of the present application, when the first tension detection member 530 detects that the tension value of the electrode sheet 600 is greater than a preset value, the second temporary-storage mechanism outputs a longer electrode sheet 600 to be wound by the winding assembly 230, thereby reducing the risk of breakage of the electrode sheet 600 pulled by the winding assembly 230. When the first tension detection member 600 detects that the tension value of the electrode sheet 600 is less than the preset tension value, the second temporary-storage mechanism temporarily stores the electrode sheet 600, thereby reducing the risk of the electrode sheet 600 becoming superfluous and loose and falling. The first tension detection member 530 may be a tension roller, or the like.

As shown in FIGS. 1 and 2, the film laminating apparatus 1000 provided in another embodiment of the present application further includes a visual detection mechanism 540 mounted on the frame 100 and used for detecting defects on the electrode sheet 600 outputted by the second temporary-storage mechanism 520.

The visual detection mechanism 540 is a component for detecting defects on the electrode sheet 600.

In the film laminating apparatus 1000 of this embodiment of the present application, when the electrode sheet 600 outputted by the second temporary-storage mechanism 520 is conveyed to the visual detection mechanism 540, the visual detection mechanism 540 may detect defects on the electrode sheet 600, thereby facilitating subsequent processing and improving the quality of the electrode sheet 600.

In another embodiment, the visual detection mechanism 540 includes a first camera 541 and a second camera 542, which are oppositely arranged. the electrode sheet 600 passes between the first camera 541 and the second camera 542, and the first camera 541 and the second camera 542 respectively obtain images of the opposite two surfaces of the electrode sheet 600, thereby detecting defects on the opposite two surfaces of the electrode sheet 600. It should be noted that the cameras are used for detecting the size of the electrode sheet 600, the position of the protective film on the electrode sheet 600, and the defects on the electrode sheet 600. Detection of the above defects using a camera is a relatively mature technology and will not be further elaborated here.

As shown in FIGS. 1 and 2, the film laminating apparatus 1000 provided in another embodiment of the present application further includes a marking mechanism 550 mounted on the frame 100 and used for marking the defects on the electrode sheet 600 detected by the visual detection mechanism 540.

The marking mechanism 550 is a component capable of marking the defects of the electrode sheet 600. For example, the marking mechanism may attach a label, draw a mark, or punch a mark on the defects on the electrode sheet 600. It should be noted that the marking mechanism 550 may be any mechanism on the market capable of marking the electrode sheet 600, which is not limited here.

In the film laminating apparatus 1000 of this embodiment of the present application, the marking mechanism 550 can mark the defects on the electrode sheet 600 to facilitate subsequent processing and improve the quality of the electrode sheet 600.

In another embodiment, the film laminating apparatus 1000 further includes an encoding roller 570 mounted on the frame 100 and positioned between the second temporary-storage mechanism 520 and the visual detection mechanism 540. The electrode sheet 600 outputted by the second temporary-storage mechanism 520 is wound around the encoding roller 570 and then enters the visual detection mechanism 540. The encoding roller 570 is electrically connected to the visual detection mechanism 540. When the second temporary-storage mechanism 520 outputs the electrode sheet 600 to drive the encoding roller 570 to rotate, the encoding roller 570 feeds back a signal to the visual detection mechanism 540. Upon receiving the signal, the visual detection mechanism 540 is started to detect defects on the electrode sheet 600.

In another embodiment, as shown in FIG. 1, the receiving assembly 210, the first correcting member 561, and the first temporary-storage mechanism 510 are sequentially distributed on the left side of the film laminating mechanism 400 from left to right; the drawing assembly 220, the second temporary-storage mechanism 520, the encoding roller 570, and the visual detection mechanism 540 are sequentially distributed on the right side of the film laminating mechanism 400 from left to right; and the first tension detection member 530, the second correcting member 562, the marking mechanism 550, and the winding assembly 230 are arranged below the film laminating mechanism 400 and distributed sequentially from right to left. This layout of the entire film laminating apparatus 1000 has a compact structure, a small volume, and small space occupation. the electrode sheet 600 received by the receiving assembly 210 is conveyed into the first correcting member 561 for correction, and the corrected electrode sheet 600 passes through the first temporary-storage mechanism 510, the film laminating mechanism 400, the drawing assembly 220, the second temporary-storage mechanism 520, the encoding roller 570, and the visual detection mechanism 540 from left to right. Then the electrode sheet 600 is conveyed into the first tension detection member 530 for detection, and the detected electrode sheet 600 sequentially passes through the second correcting member 562 and the marking mechanism 550 from right to left and enters the winding reel to be wound. In this manner, lamination of the film on the electrode sheet 600 is completed.

Figure 10:
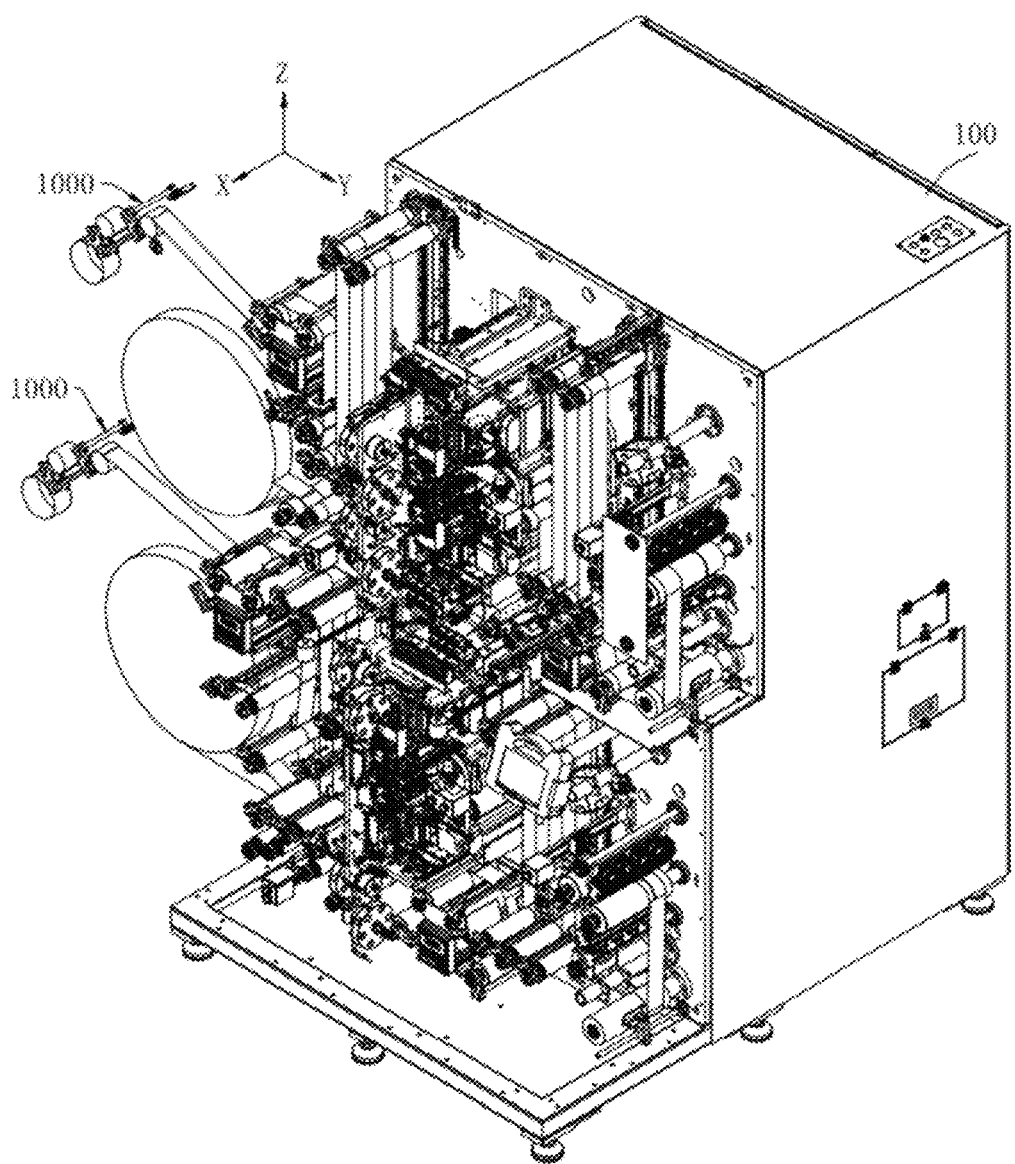
FIG. 10 is a structural schematic diagram of a plurality of film laminating apparatuses provided in an embodiment of the present application from one perspective.
Figure 11:
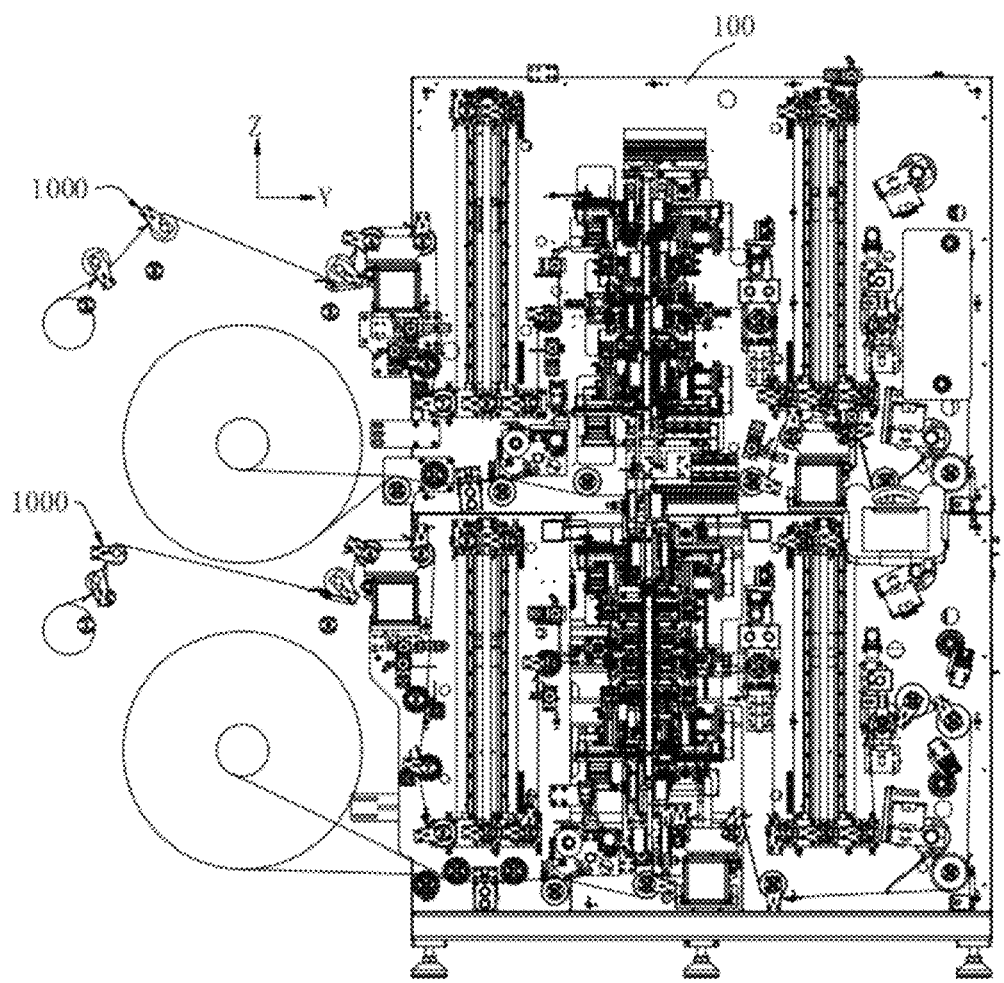
FIG. 11 is a structural schematic diagram of the plurality of film laminating apparatuses provided in an embodiment of the present application from another perspective.

In another embodiment of the present application, as shown in FIGS. 10 and 11, an electrode sheet processing device is provided, including the aforementioned film laminating apparatus 1000.

an electrode sheet processing device of an embodiment of the present application uses the aforementioned film laminating apparatus 1000. The volume of the film laminating apparatus 1000 in the conveying direction of an electrode sheet 600 is small, which can also reduce the volume of the whole electrode sheet processing device and reduce the occupation of space. The electrode sheet processing device can be suitable for a smaller mounting space, and the application scenarios of the electrode sheet processing device are expanded.

As shown in FIGS. 10 and 11, the electrode sheet processing device provided in another embodiment of the present application further includes a die-cutting apparatus, and the number of the film laminating apparatuses 1000 is two. The die-cutting apparatus is used for dividing an electrode sheet 600 into two electrode sheets 600. The two film laminating apparatuses 1000 are arranged vertically and used for receiving the two electrode sheets 600 and laminating films on the two electrode sheets 600. The frames 100 of the two film laminating apparatuses 1000 shown in FIGS. 10 and 11 are of an integrated structure. Of course, in other embodiments, the frames 100 of the two film laminating apparatuses 1000 may also be of a split structure, which can be specifically selected according to actual needs and is not limited here.

In the electrode sheet processing device of this embodiment of the present application, as shown in FIGS. 10 and 11, the die-cutting apparatus die cuts an electrode sheet material into two electrode sheets 600, and the two electrode sheets 600 are respectively introduced into the two film laminating apparatuses 1000 arranged vertically. The two film laminating apparatuses 1000 respectively laminate films on the two electrode sheets 600, achieving simultaneous film lamination of the two electrode sheets 600. Manual transportation of the cut electrode sheets 600 to the film laminating apparatuses 1000 is not required, improving the production efficiency and reducing labor costs. In addition, the two film laminating apparatuses 1000 are arranged vertically, have a compact structure, and are conducive to reducing the volume of the electrode sheet processing device. The film laminating apparatuses 1000 in the electrode sheet processing device match the die-cutting apparatus, achieving online dual station lamination of protective films.

Due to the fact that the electrode sheet processing device in this embodiment of the present application adopts all the technical solutions of the above embodiments, the electrode sheet processing device has all the beneficial effects brought by the technical solutions of the above embodiments, which will not be further elaborated here one by one.

The above descriptions are merely preferred embodiments of the present application and are not intended to limit the present application. Any modifications, equivalent substitutions, and improvements made within the spirit and principles of the present application shall be included in the scope of protection of the present application.

What is claimed is:

1. A film laminating apparatus, comprising a frame, a conveying mechanism, a mounting plate, and a plurality of film laminating mechanisms, the plurality of film laminating mechanisms being mounted on the mounting plate; the conveying mechanism being mounted on the frame and being capable of conveying an electrode sheet in a first direction into the film laminating apparatus; and the mounting plate being mounted on the frame and forming an included angle with the first direction, herein the film laminating mechanism comprises a first film suction member, a film pulling module, a film cutting module, and a film laminating module which are mounted on the mounting plate, the first film suction member being used for sucking a protective film;

the film laminating module comprising a second film suction member, and the first film suction member and the second film suction member being arranged apart;

the film pulling module being used for pulling the protective film from the first film suction member onto the second film suction member; and the film cutting module being used for cutting the protective film between the first film suction member and the second film suction member.

2. The film laminating apparatus according to claim 1, wherein the included angle between the mounting plate and the first direction is 85° to 95°.

3. The film laminating apparatus according to claim 2, wherein the mounting plate is arranged perpendicular to the first direction.

4. The film laminating apparatus according to claim 1, wherein the number of the film laminating mechanisms is two, and the two film laminating mechanisms are distributed in the height direction of the mounting plate and used for laminating films on the opposite two surfaces of an electrode sheet respectively.

5. The film laminating apparatus according to claim 1, wherein the film pulling module comprises a first film pulling driving member, a second film pulling driving member, and a film adhering assembly, the film adhering assembly being used for adhering a protective film;

the first film pulling driving member being connected to the film adhering assembly and used for driving the film adhering assembly to abut against the protective film on the first film suction member, so that the protective film is adhered to the film adhering assembly; and the second film pulling driving member being mounted on the mounting plate, connected to the first film pulling driving member, and used for driving the film adhering assembly to move in a direction from the first film suction member to the second film suction member, so that the protective film adhered to the film adhering assembly is transferred to the second film suction member.

6. The film laminating apparatus according to claim 5, wherein the film adhering assembly comprises a film adhering roller, a film adhering mounting rack, and an abutting telescopic member mounted on the film adhering mounting rack, the film adhering roller being rotatably mounted on the film adhering mounting rack and used for adhering the protective film; a telescopic end of the abutting telescopic member being used for abutting against the film adhering roller to prevent the film adhering roller from rotating; and the first film pulling driving member being connected to the film adhering mounting rack.

7. The film laminating apparatus according to claim 1, wherein the film laminating mechanism further comprises an unwinding reel, a damper, and a temporary-storage film feeding mechanism which are mounted on the mounting plate, the damper being used for winding the protective film unwound by the unwinding reel, and the temporary-storage film feeding mechanism being used for temporarily storing the protective film drawn out from the damper, tensioning the temporarily stored protective film, and then introducing the protective film to the first film suction member.

8. The film laminating apparatus according to claim 7, wherein the temporary-storage film feeding mechanism comprises a lift cylinder, a first temporary-storage roller, a second temporary-storage roller, and a conveying roller which are mounted on the mounting plate, both the first temporary-storage roller and the conveying roller being arranged above the second temporary-storage roller; the first temporary-storage roller, the second temporary-storage roller, and the conveying roller being used for winding the protective film outputted by the damper in sequence; the conveying roller being used for guiding the protective film to the first film suction member; and a piston rod of the lift cylinder being connected to the second temporary-storage roller and used for driving the second temporary-storage roller to move downwards.

9. The film laminating apparatus according to claim 1, wherein the film laminating module further comprises an adjustment driving assembly and a plurality of connecting assemblies, the adjustment driving assembly being connected to the mounting plate; each connecting assembly being connected to the second film suction member; all the connecting assemblies being distributed at intervals; each connecting assembly being connected to the adjustment driving assembly; and the adjustment driving assembly being used for driving two adjacent connecting assemblies to be close to or far away from each other.

10. The film laminating apparatus according to claim 9, wherein the connecting assembly comprises a first connecting rack, a second connecting rack, a film laminating driving member, and a temporary-storage driving member, the first connecting rack being connected to the adjustment driving assembly; the film laminating driving member being mounted on the first connecting rack; the second film suction member being mounted on the second connecting rack; the film laminating driving member being connected to the second connecting rack and used for driving the second film suction member to move towards an electrode sheet in a second direction to adhere the protective film sucked by the second film suction member to the electrode sheet; and the temporary-storage driving member being connected to the second connecting rack and the first connecting rack, and used for driving the second film suction member to move in the direction opposite to the second direction.

11. The film laminating apparatus according to claim 1, wherein the film laminating apparatus further comprises a first temporary-storage mechanism mounted on the frame, and the conveying mechanism comprises a receiving assembly and a drawing assembly mounted on the frame, the receiving assembly being used for receiving an electrode sheet conveyed by an external device;

the first temporary-storage mechanism being positioned between the receiving assembly and the film laminating apparatus; the receiving assembly being positioned between the first temporary-storage mechanism and the drawing assembly;

the first temporary-storage mechanism being used for temporarily storing an electrode sheet conveyed by the receiving assembly; and the drawing assembly being used for drawing and stopping continuous conveying of the electrode sheet drawn out from the film laminating mechanism.

12. The film laminating apparatus according to claim 11, wherein the first temporary-storage mechanism comprises a temporary-storage driving member, a third temporary-storage roller for winding an electrode sheet, and a fourth temporary-storage roller for winding an electrode sheet, the temporary-storage driving member being mounted on the frame; both the third temporary-storage roller and the fourth temporary-storage roller being connected to the temporary-storage driving member; and the temporary-storage driving member being used for driving the fourth temporary-storage roller to move close to or away from the third temporary-storage roller.

13. The film laminating apparatus according to claim 12, wherein the film laminating apparatus further comprises a second temporary-storage mechanism mounted on the frame, and the conveying mechanism further comprises a winding assembly mounted on the frame, the second temporary-storage mechanism being used for temporarily storing the electrode sheet outputted by the drawing assembly, and the winding assembly being used for winding the electrode sheet outputted by the second temporary-storage mechanism.

14. The film laminating apparatus according to claim 13, wherein the film laminating apparatus further comprises a first tension detection member, the first tension detection member being mounted on the frame, used for detecting the tension of an electrode sheet outputted by the second temporary-storage mechanism, and electrically connected to the second temporary-storage mechanism.

15. The film laminating apparatus according to claim 13, wherein the film laminating apparatus further comprises a visual detection mechanism mounted on the frame and used for detecting defects on the electrode sheet outputted by the second temporary-storage mechanism.

16. The film laminating apparatus according to claim 15, wherein the film laminating apparatus further comprises a marking mechanism mounted on the frame and used for marking the defects on the electrode sheet detected by the visual detection mechanism.

17. An electrode sheet processing device, comprising the film laminating apparatus according to claim 1.

18. The electrode sheet processing device according to claim 17, wherein the electrode sheet processing device comprises a die-cutting apparatus, and the number of the film laminating apparatuses is two, the die-cutting apparatus being used for dividing an electrode sheet into two electrode sheets; and the two film laminating apparatuses being arranged vertically and used for receiving the two electrode sheets and laminating films on the two electrode sheets.

* * * * *